(12) United States Patent
Oiwa et al.

(10) Patent No.: US 8,391,631 B2
(45) Date of Patent: Mar. 5, 2013

(54) IMAGE PROCESSING PROGRAM, IMAGE PROCESSING APPARATUS, IMAGE PROCESSING METHOD AND IMAGE PROCESSING SYSTEM

(75) Inventors: Ryota Oiwa, Kyoto (JP); Atsushi Okumura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 337 days.

(21) Appl. No.: 12/816,693

(22) Filed: Jun. 16, 2010

(65) Prior Publication Data

US 2011/0169853 A1 Jul. 14, 2011

(30) Foreign Application Priority Data

Jan. 13, 2010 (JP) ................................. 2010-004612

(51) Int. Cl.
*G06K 9/40* (2006.01)
(52) U.S. Cl. ...................................................... 382/266
(58) Field of Classification Search .................. 382/199, 382/256, 266
See application file for complete search history.

(56) References Cited

U.S. PATENT DOCUMENTS

| | | | | |
|---|---|---|---|---|
| 5,457,754 A | * | 10/1995 | Han et al. | 382/128 |
| 5,835,236 A | * | 11/1998 | Barbari | 358/442 |
| 5,995,662 A | * | 11/1999 | Totsuka et al. | 382/199 |
| 6,031,564 A | * | 2/2000 | Ma et al. | 348/43 |
| 6,665,439 B1 | * | 12/2003 | Takahashi | 382/199 |
| 7,697,776 B2 | * | 4/2010 | Wu et al. | 382/254 |
| 2002/0113884 A1 | * | 8/2002 | Tanii et al. | 348/241 |
| 2009/0245755 A1 | * | 10/2009 | Lee et al. | 386/114 |
| 2011/0098056 A1 | * | 4/2011 | Rhoads et al. | 455/456.1 |

FOREIGN PATENT DOCUMENTS

JP  2008236739 A  * 10/2008

OTHER PUBLICATIONS

ArcSoft, In.c, "Arcsoft Magic-i Visual Effects 2.0.0.65", Oct. 8, 2009, http://arcsoft-magic-i-visual-effects.en.softonic.com.*
Nintendo Corporation, "Itudemo purikura*kiradeko puremiamu: konna puri ga satuei dekimasu!" [online], [searched on Dec. 25, 2009], the Internet URL:http://www.nintendo.co.jp/ds/dsiware/khdj/film/frame/page3.html, 2 pages.
Adobe Systems Incorporated, "Adobe Photoshop Elements", "gyakkou" firuta de syasin wo ensyutusiyou [online], [searched on Dec. 25, 2009], the Internet URL:http://www.adobe.com/jp/digitalimag/consumer/portal/tips/04/stepupTip.html, 4 pages.

* cited by examiner

*Primary Examiner* — Samir Ahmed
*Assistant Examiner* — Totam Le
(74) *Attorney, Agent, or Firm* — Nixon & Vanderhye P.C.

(57) ABSTRACT

A CPU of an image processing apparatus detects an outline from an original image, selects from the positions in association with the detected outline a position to be drawn at a ratio in correspondence with a predetermined ratio, for example, the number of positions, and draws an object at the selected position.

16 Claims, 27 Drawing Sheets

FIG.6
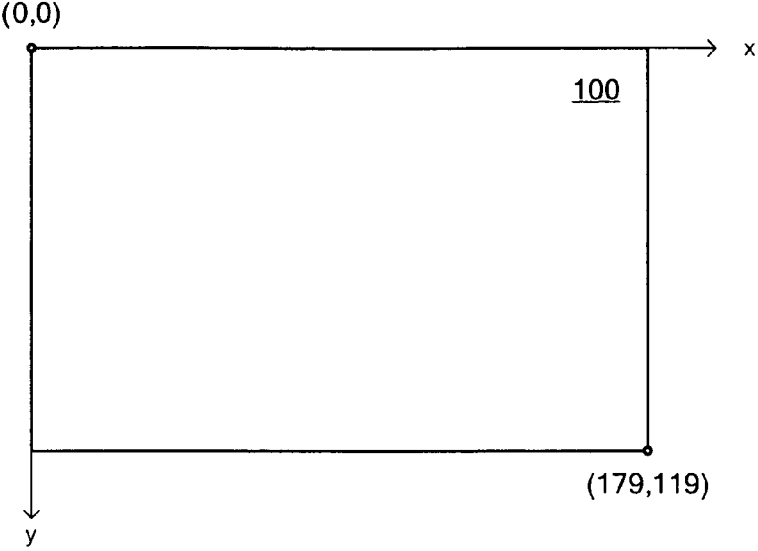
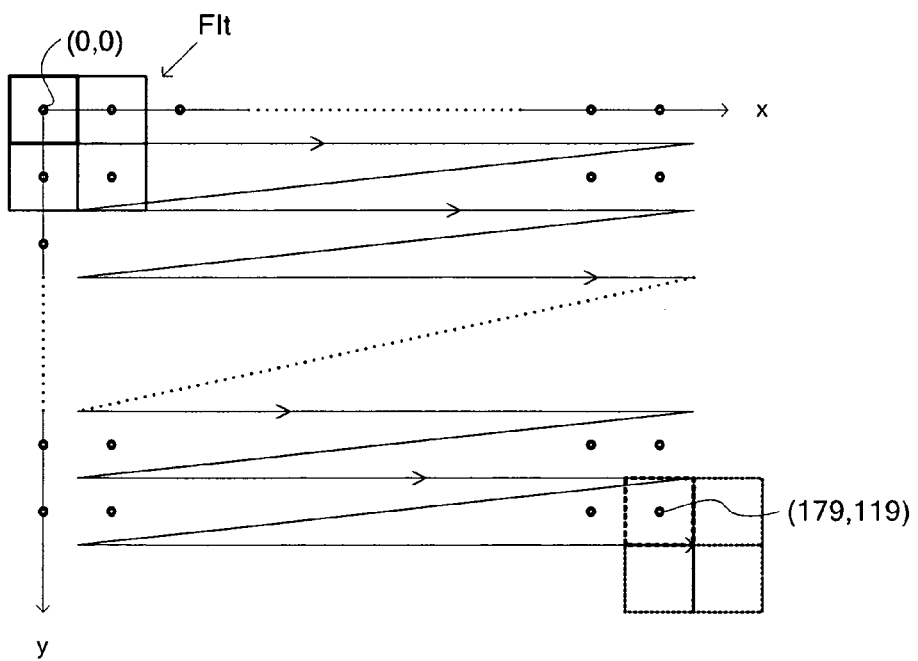
(C) Flt
| 0 | 2 |
|---|---|
| 1 | 3 |
(D) Flt
| 1 | -1 |
|---|----|
| -1 | 1 |
ΔR= ( R(0)+R(3))- ( R(1)+R(2) )
ΔG= ( G(0)+G(3))- ( G(1)+G(2) )
ΔB= ( B(0)+B(3))- ( B(1)+B(2) )

FIG.7
(A)
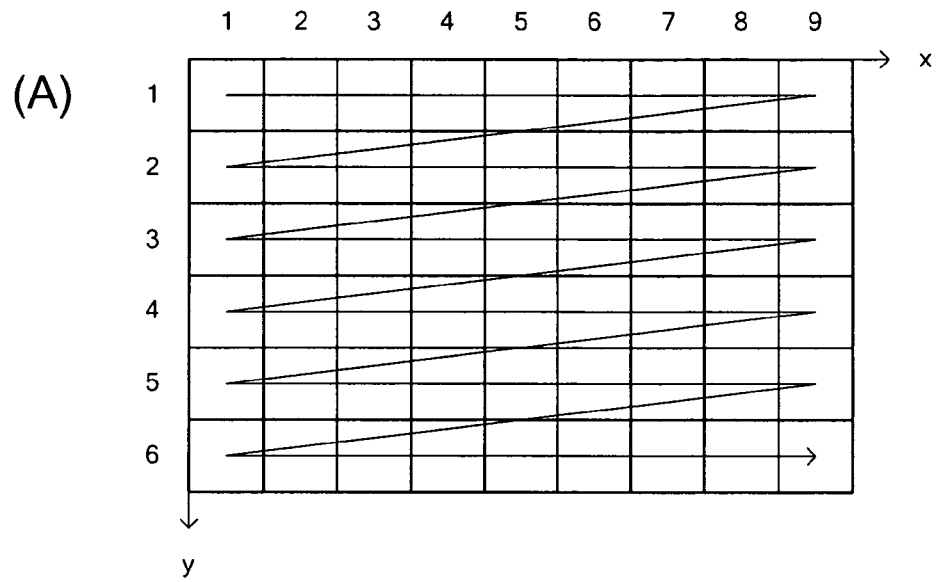
(B)
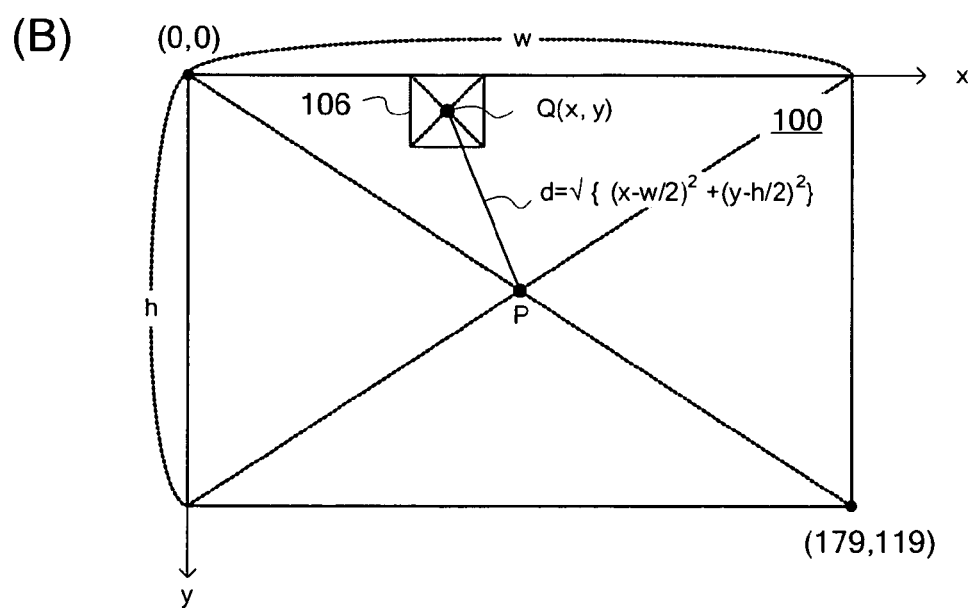

FIG. 8

(A) (PROBABILITY TABLE) 84

| THE NUMBER OF CANDIDATE SECTIONS (C) | PROBABILITY |
|---|---|
| C < 8 | 40% |
| 8 ≦ C < 10 | 35% |
| 10 ≦ C < 12 | 30% |
| 12 ≦ C | 25% |

(B) (FACTOR TABLE) 86

| DISTANCE FROM CENTER (d) | FACTOR (FOR PROBABILITY CORRECTION) |
|---|---|
| d < 30 | 0.25 TIMES |
| 30 ≦ d | 1 TIME |

FIG. 9

(OBJECT TABLE) 88

| OBJECT NUMBER | 1 | 2 | ... |
|---|---|---|---|
| MANNER | ☆ | ☆ | ... |

FIG. 11
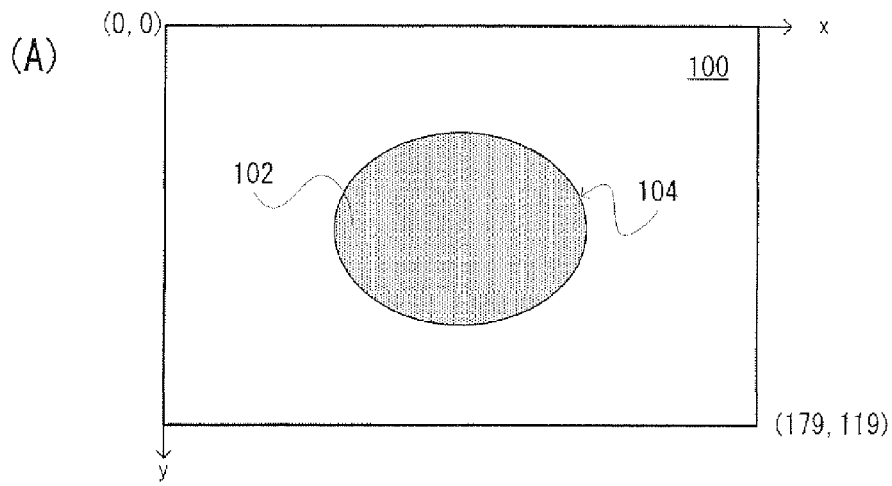
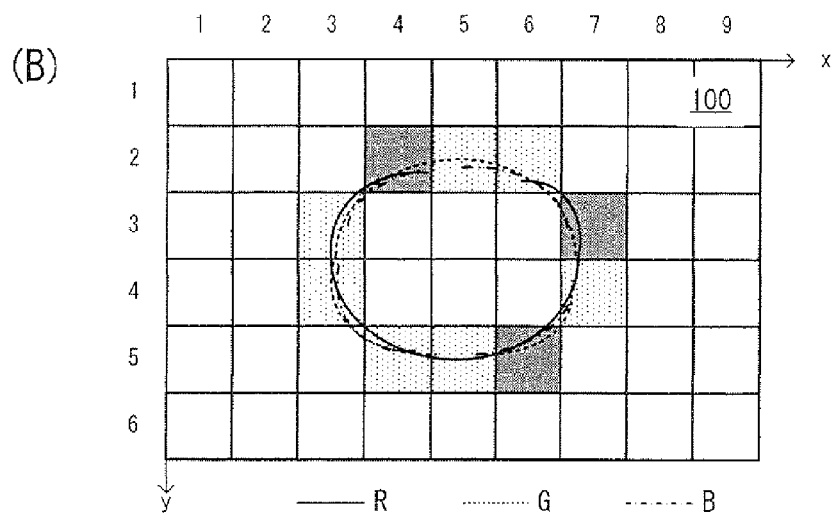
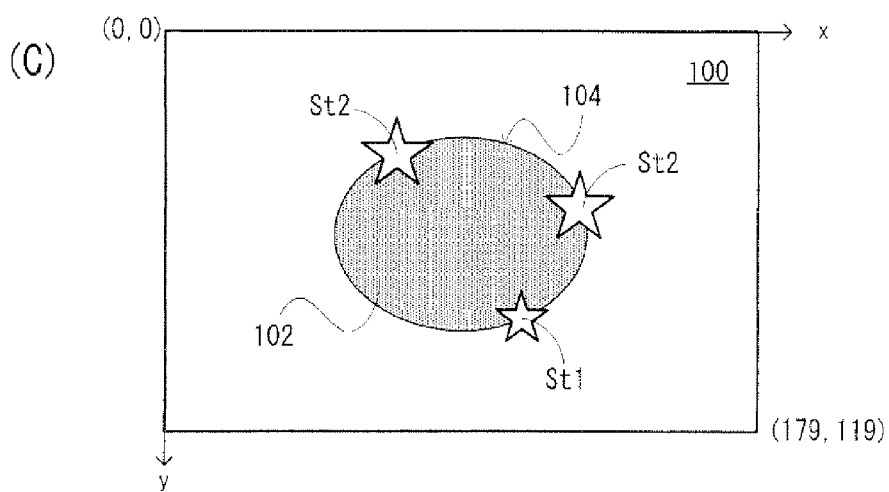

FIG. 14

(SECTION DATA)

82

| SECTION NUMBER | POSITION | DISTANCE (d) | ACCUMULATED DIFFERENCE VALUE (B) | CANDIDATE FLAG | PROBABILITY (p) | | TARGET FLAG | OBJECT NUMBER |
|---|---|---|---|---|---|---|---|---|
| | | | | | PROBABILITY TO BE CORRECTED | CORRECTED PROBABILITY | | |
| (1,1) | (0,0)-(19,19) | (94) | *** | OFF | - | - | OFF | - |
| ⋮ | ⋮ | ⋮ | ⋮ | ⋮ | ⋮ | ⋮ | ⋮ | ⋮ |
| (4,2) | (60,20)-(79,39) | 36 | *** | ON | 25% | 25% | OFF | - |
| (5,2) | (80,20)-(99,39) | 30 | *** | ON | 25% | 25% | OFF | - |
| (6,2) | (100,20)-(119,39) | 36 | *** | ON | 25% | 25% | ON | 1 |
| ⋮ | ⋮ | ⋮ | ⋮ | ⋮ | ⋮ | ⋮ | ⋮ | ⋮ |
| (3,3) | (40,40)-(59,59) | 41 | *** | ON | 25% | 25% | ON | 2 |
| (4,3) | (60,40)-(79,59) | (22) | *** | OFF | - | - | OFF | 2 |
| ⋮ | ⋮ | ⋮ | ⋮ | ⋮ | ⋮ | ⋮ | ⋮ | ⋮ |
| (9,6) | (160,100)-(179,119) | (94) | *** | OFF | - | - | OFF | - |

FIG. 15

(SECTION DATA)

82

| SECTION NUMBER | POSITION | DISTANCE (d) | ACCUMULATED DIFFERENCE VALUE (B) | CANDIDATE FLAG | PROBABILITY (p) | | TARGET FLAG | OBJECT NUMBER |
|---|---|---|---|---|---|---|---|---|
| | | | | | PROBABILITY TO BE CORRECTED | CORRECTED PROBABILITY | | |
| (1, 1) | (0, 0)-(19, 19) | (94) | *** | OFF | — | — | OFF | — |
| ⋮ | ⋮ | ⋮ | ⋮ | ⋮ | ⋮ | ⋮ | ⋮ | ⋮ |
| (4, 2) | (60, 20)-(79, 39) | 36 | *** | ON | 30% | 30% | ON | 1 |
| (5, 2) | (80, 20)-(99, 39) | 30 | *** | ON | 30% | 30% | OFF | — |
| (6, 2) | (100, 20)-(119, 39) | 36 | *** | ON | 30% | 30% | OFF | — |
| ⋮ | ⋮ | ⋮ | ⋮ | ⋮ | ⋮ | ⋮ | ⋮ | ⋮ |
| (3, 3) | (40, 40)-(59, 59) | 41 | *** | ON | 30% | 30% | OFF | — |
| (4, 3) | (60, 40)-(79, 59) | (22) | *** | OFF | — | — | OFF | — |
| ⋮ | ⋮ | ⋮ | ⋮ | ⋮ | ⋮ | ⋮ | ⋮ | ⋮ |
| (9, 6) | (160, 100)-(179, 119) | (94) | *** | OFF | — | — | OFF | — |

FIG. 16

(SECTION DATA) 82

| SECTION NUMBER | POSITION | DISTANCE (d) | ACCUMULATED DIFFERENCE VALUE (B) | CANDIDATE FLAG | PROBABILITY (p) | | TARGET FLAG | OBJECT NUMBER |
|---|---|---|---|---|---|---|---|---|
| | | | | | PROBABILITY TO BE CORRECTED | CORRECTED PROBABILITY | | |
| (1,1) | (0,0)-(19,19) | (94) | *** | OFF | - | - | OFF | - |
| : | : | : | : | : | : | : | : | : |
| (4,2) | (60,20)-(79,39) | (36) | *** | OFF | - | - | OFF | - |
| (5,2) | (80,20)-(99,39) | (30) | *** | OFF | - | - | OFF | - |
| (6,2) | (100,20)-(119,39) | 36 | *** | ON | 35% | 35% | ON | 1 |
| : | : | : | : | : | : | : | : | : |
| (3,3) | (40,40)-(59,59) | (41) | *** | OFF | 35% | - | OFF | - |
| (4,3) | (60,40)-(79,59) | 22 | *** | ON | - | 8.75% | OFF | - |
| : | : | : | : | : | : | : | : | : |
| (9,6) | (160,100)-(179,119) | (94) | *** | OFF | - | - | OFF | - |

(A)

(B) (PROBABILITY TABLE) 84

| THE NUMBER OF CANDIDATE SECTIONS (C) | PROBABILITY |
|---|---|
| C < 300 | 7% |
| 300 ≦ C < 400 | 6% |
| 400 ≦ C < 500 | 4% |
| 500 ≦ C | 3% |

(C) (FACTOR TABLE) 86

| DISTANCE FROM CENTER (d) | FACTOR (FOR PROBABILITY CORRECTION) |
|---|---|
| d < 600 | 0.1 TIMES |
| 60 ≦ d < 80 | 0.5 TIMES |
| 80 ≦ d < 100 | 0.75 TIMES |
| 100 ≦ d | 1 TIME |

FIG. 26
(A)
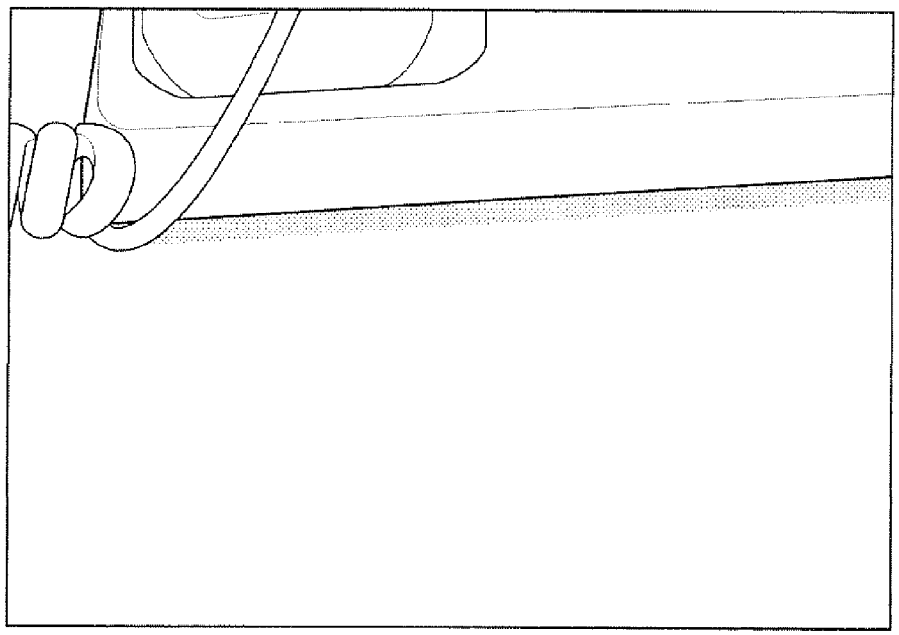
(B)
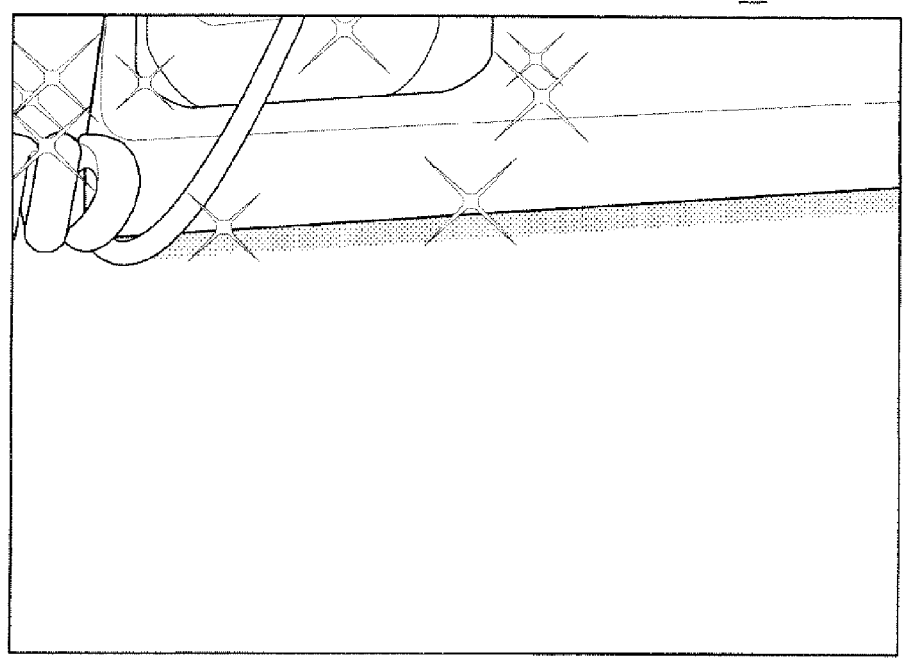

FIG. 27
(A)
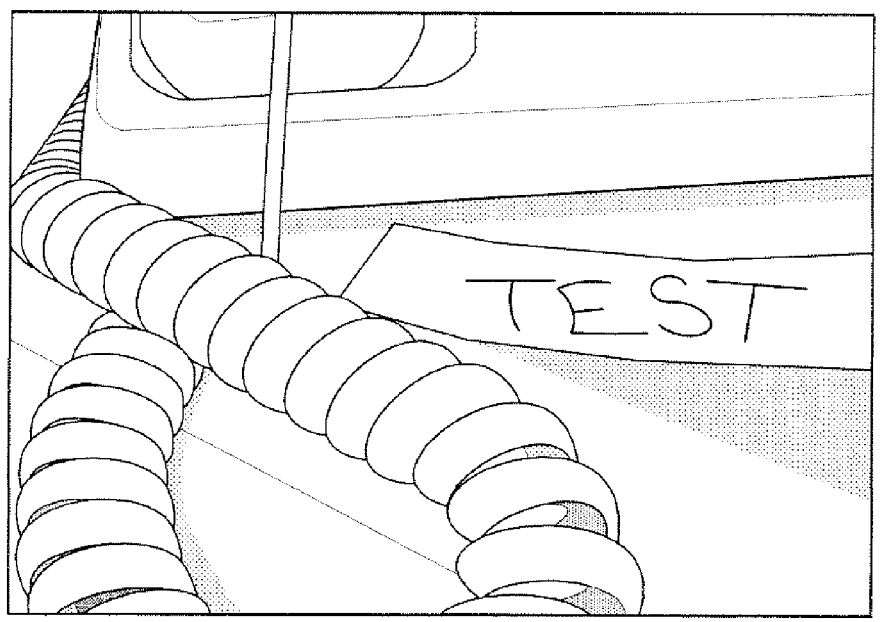
(B)
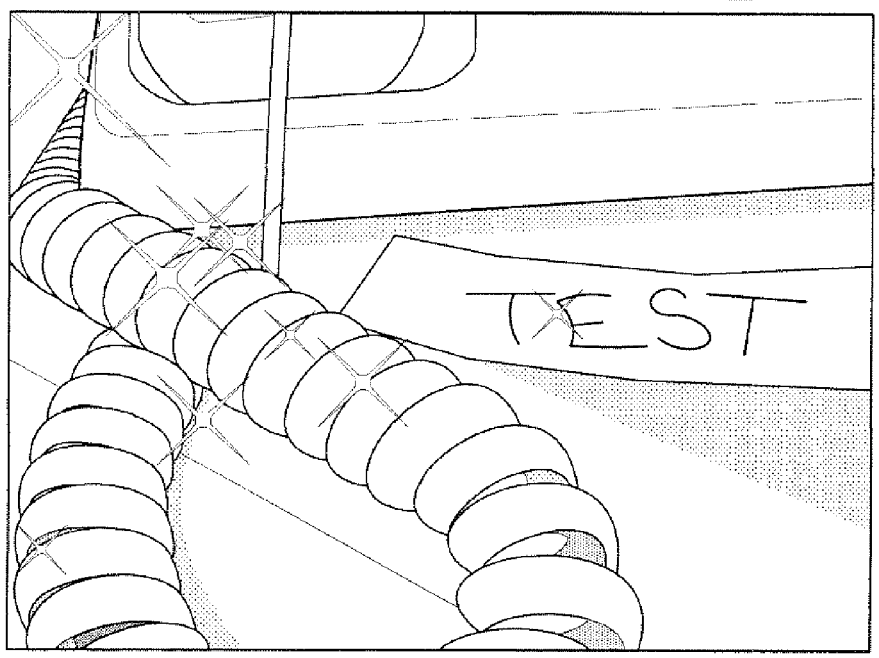

(IMAGE ATTACHED WITH STARS WHEN PROBABILITY TABLE AND CORRECTION TABLE ARE NOT USED : MORE PART OF OUTLINE)

(IMAGE WITH STARS IN VARIOUS MANNERS : GRADATION IN CORRESPONDENCE WITH DISTANCE FROM CENTER)

(MODIFIED EXAMPLE : SECTION IS MADE LARGE AS IMAGE IS LARGE )

(MODIFIED EXAMPLE : SIZE OF SECTION IS CHANGED DEPENDING ON SIZE OF STAR )

ously become a predetermined ratio as a result. In addition, as in an eleventh invention, if the probability is set or corrected for each position, and whether or not each position is the object to be drawn is individually decided based on the probability, it is possible to adjust the arrangement of the drawing in the image (drawing can be made thinly at one part of the image, and densely at another part of the image, for example).

IMAGE PROCESSING PROGRAM, IMAGE PROCESSING APPARATUS, IMAGE PROCESSING METHOD AND IMAGE PROCESSING SYSTEM

CROSS REFERENCE OF RELATED APPLICATION

The disclosure of Japanese Patent Application No. 2010-4612 is incorporated herein by reference.

BACKGROUND OF THE INVENTION

1. Field of the Invention

The present invention relates to an image processing program and an image processing apparatus. More specifically, the present invention relates to an image processing program, an image processing apparatus, an image processing method and an image processing system which arrange objects on and adds effects to an image.

2. Description of the Related Art

Conventionally, in editing an image, there are examples of arranging a predetermined object and adding a predetermined effect at an arbitrary position on an image.

In a nonpatent literature 1, a program capable of arranging a decoration at a touched position with a touch pen as if a stamp is affixed is disclosed.

Furthermore, in a nonpatent literature 2, a "backlight filter" for arranging light for directing brightness (highlight effect) is disclosed. The position of the highlight can be adjusted according to a designation by a user.
(Nonpatent Literature 1)
Nintendo Corporation, "Itudemo purikura☆kiradeko puremiamu: konna puri ga satuei dekimasur!" [online], [searched on Dec. 25, 2010], the Internet <URL:http://www.nintendo.co.jp/ds/dsiware/khdj/film/frame/page3.html>
(Nonpatent Literature 2)
Adobe Systems Incorporated, "Adobe Photoshop Elements", "gyakkou" firuta de syasin wo ensyutusiyou" [online], [searched on Dec. 25, 2010], the Internet <URL:http://www.adobe.com/jp/digitalimag/consumer/portal/tips/04/stepupTip.html>

By the way, an application of a print club sticker, etc., has a need of making an image high attractive by arranging objects, such as a star, and adding effects, such as sharpness at an outline included in an image.

However, both of the programs disclosed in the nonpatent literature 1 and the nonpatent literature 2 are for arranging an object and adding effects at a position designated by a user, and therefore, designating every position along the outline is time consuming.

SUMMARY OF THE INVENTION

Therefore, it is a primary object of the present invention to provide a novel image processing program, an image processing apparatus, an image processing method and an image processing system.

Another object of the present invention is to provide an image processing program, image processing apparatus, image processing method and image processing system which allows the user to perform a predetermined drawing at an outline position of an image without the user himself or herself designating the position.

The present invention adopts the following configuration in order to solve the aforementioned problems.

A first invention is a storage medium storing an image processing program, and the image processing program causes a computer of an image processing apparatus to execute: an outline detector for detecting an outline from an image; a position-to-be-drawn selector which selects a position to be drawn from positions in relation to the outline detected by the outline detector; and a drawer which performs a predetermined drawing at the position selected by the position-to-be-drawn selector.

Here, the position is a section being made up of a plurality of pixels or a position by pixels. The predetermined drawing includes drawing an object and/or drawing effects, for example. Here, drawing effects means that effects are added to an image (special effects: blur, sharpness, gradation, coloration, etc.), for example, and is implemented by changing a pixel value by a calculation, such as a filter arithmetic operation, etc.

According to the first invention, a position-to-be drawn is selected from the outline, and drawing is made at the position, and therefore, it is possible to easily perform a predetermined drawing at the position in relation to the outline irrespective of an instruction from the user.

A second invention is a storage medium storing an image processing program according to the first invention, and the position-to-be-drawn selector selects the position to be drawn from the positions in relation to the outline according to a predetermined ratio.

The ratio here includes a numerical ratio and/or a spatial ratio of the positions, for example. In a certain embodiment, a position selection is made at the numerical ratio, such as one to ten positions. In a still another embodiment, a position selection is made according to the spatial ratio, such as one selection after nine unselections. In another embodiment, as in a tenth invention described later, by determining whether or not each position in relation to the outline is an object to be drawn on the basis of the probability, the numerical ratio and the spatial ratio of the positions averagely become a predetermined ratio as a result. In addition, as in an eleventh invention, if the probability is set or corrected for each position, and whether or not each position is the object to be drawn is individually decided based on the probability, it is possible to adjust the arrangement of the drawing in the image (drawing can be made thinly at one part of the image, and densely at another part of the image, for example).

According to the second invention, the position to be drawn is selected from the positions in relation to the outline at a predetermined ratio, and thus, it is possible to properly draw objects and effects at the positions in relation to the outline, capable of performing highly attractive drawing.

A third invention is a storage medium storing an image processing program according to the second invention, and the position-to-be-drawn selector counts the positions in relation to the outline, sets the ratio in correspondence with the number of positions in relation to the outline, and selects the position to be drawn from the positions in relation to the outline according to the ratio.

In the third invention, depending on the number of positions in relation to the outline, the ratio, moreover, the number of the positions to be selected is changed.

According to the third invention, depending on the quantity of the parts of the outline, it is possible to adjust the number of drawings in the entire image.

A fourth invention is a storage medium storing an image processing program according to the third invention, and the position-to-be-drawn selector sets a small ratio as the number of positions in relation to the outline is many.

According to the fourth invention, the more the positions in relation to the outline are, the smaller the ratio is. Thus, it is possible to adjust the number of drawings so as to be equal even if drawing is made on any image, such as an image containing more outline parts/an image containing less outline parts.

A fifth invention is a storage medium storing an image processing program according to the first invention, and the position-to-be-drawn selector calculates a distance from a predetermined position of the image to each of the positions in relation to the outline, sets a ratio at which the position to be drawn is selected in correspondence with the distance, and selects the position to be drawn according to the ratio from the positions in relation to the outline.

In the fifth invention, a ratio in correspondence with a distance from the predetermined position of the image to each position is individually set.

In the embodiment of deciding whether or not each position is an object to be drawn based on the probability (p) as described above, the probability is individually corrected according to the distance from the predetermined position of the image to each position.

According to the fifth invention, it is possible to change the ratio of drawing in correspondence with the distance from the predetermined position. For example, as to an image containing a subject at a predetermined position and a background at other positions, it is possible to perform drawing at different densities between the subject and the background.

A sixth invention is a storage medium storing an image processing program according to the fifth invention, and the position-to-be-drawn selector calculates a distance from a center of the image to each of the positions in relation to the outline, and sets a great ratio as the distance is large.

According to the sixth invention, as to each position, the larger the distance from the center of the image is, the greater ratio is set. Thus, as each position is far from the center of the image (that is, periphery of the image), the number of drawings can be increased. For example, on the assumption that most images contain the subject at the center of the image and the background at the periphery, it is possible to make a drawing overlapped with the subject less, and make a drawing overlapped with the background more.

A seventh invention is a storage medium storing an image processing program according to the first invention, and the position-to-be-drawn selector randomly selects the position to be drawn from the positions in relation to the outline.

According to the seventh invention, from the positions in relation to the outline (sections including the outline, the outline being made up of pixels, etc.), the position to be drawn is randomly selected, and therefore, it is possible to give a variety to a pattern for drawing objects and effects on the outline, and enjoy unpredictability and contingency.

An eighth invention is a storage medium storing an image processing program according to the first invention, and the outline detector calculates, as to each pixel making up of the image, for each color component, a difference value between a first summed value obtained by summing color component values of the pixel, or the pixel and one or more adjacent pixels, and a second summed value obtained by summing color component values of the adjacent pixels not including the pixel which is the same number of pixels as that used for calculating the first summed value and calculates a summed difference value ($A=\Delta R+\Delta G+\Delta B$) by adding these difference values calculated for each color component as to the pixel, determines whether or not the summed difference value (A) in each pixel of the image is equal to or more than a first threshold value (ThA), and detects the pixel which is determined to be equal to or more than the first threshold value as a pixel making up of the outline.

In the eighth invention, at a time of detecting the outline, a difference value is calculated between a plurality of pixels including the relevant pixel and a plurality of pixels not including the relevant pixel for each color component, the difference values of the respective color components are summed, and if the summed difference value is equal to or more than the first threshold value, the relevant pixel is determined as an outline. Here, in place of calculating the difference value between the first summed value and the second summed value, a difference value between the relevant pixel and one pixel adjacent thereto may be calculated.

According to the eighth invention, the determination is made by using the first threshold value, and therefore, it is possible to adequately detect the outline with the noise removed. Furthermore, the difference value is calculated for each color component, and the difference values of the respective color components are summed, capable of reflecting the change in tinge. Even if in an image showing a subject and a background, there is a difference in color (RGB, for example) between the subject and the background, there may be not so much of a difference in brightness (Y, for example), but in this case as well, it is possible to properly detect the outline.

A ninth invention is a storage medium storing an image processing program according to the first invention, and the image is divided into a plurality of sections each being made up of two or more pixels, and the outline detector calculates, as to each pixel making up of the image, for each color component (R, G, B), a difference value between a first summed value obtained by summing color component values of the pixel, or the pixel and one or more adjacent pixels, and a second summed value obtained by summing color component values of the adjacent pixels not including the pixel which is the same number of pixels as that used for calculating the first summed value and calculates a summed difference value ($A=\Delta R+\Delta G+\Delta B$) by adding these difference values calculated for each color component as to the pixel, determines whether or not the summed difference value of the pixel making up of each section is equal to or more than a first threshold value, accumulates the summed difference values (A) of the respective pixels which are determined to be equal to or more than the first threshold value for each section to evaluate an accumulated difference value (B), determines whether or not the accumulated difference value (B) of each section is equal to or more than a second threshold value (ThB) and detects the section which is determined to be equal to or more than the second threshold value as a section in relation to the outline, and the position-to-be-drawn selector selects a section to be drawn from the section in relation to the outline.

In the ninth invention, as to each pixel making up of the section, the summed difference value is compared with the first threshold value, and the summed difference values of the pixels which are determined to be equal to or more than the first threshold value are accumulated (cumulatively added) for each section. Then, the accumulated difference value is compared with the second threshold value, and the section which is determined to be equal to or more than the second threshold value is selected as sections in relation to the outline.

According to the ninth invention, the summed difference values of the pixels making up of the outline are accumulated for each section, and according to the accumulated difference value, the sections in relation to the outline are selected, capable of effectively selecting the section to be drawn.

A tenth invention is a storage medium storing an image processing program according to the second invention, and the position-to-be-drawn selector counts the positions in relation to the outline, sets a probability in correspondence with the number of positions in relation to the outline (C), and decides whether or not each of the positions in relation to the outline is an object to be drawn on the basis of the probability.

In the tenth invention, whether or not each position is an object to be drawn is decided on the basis of the probability (p), so that the numerical ratio and the spatial ratio of the positions averagely become a predetermined ratio. The reason why is multiple times of drawing change the ratio every time, but the average value approaches the predetermined value.

According to the tenth invention, it is possible to make proper quantity of drawings at proper intervals along the outline with accidental changes given.

An eleventh invention is a storage medium storing an image processing program according to the tenth invention, and the position-to-be-drawn selector calculates a distance from a predetermined position of the image to each of the positions in relation to the outline, corrects the probability in correspondence with the distance, and performs the decision on the basis of the corrected probability.

In the eleventh invention, the set probability is corrected in correspondence with the distance (d) from the predetermined position of the image to each position.

According to the eleventh invention, it is possible to adjust the arrangement of the drawing in the image with reference to the predetermined position. For example, by making the predetermined position the center of the image (P), and by correcting the probability so as to take a great value as the distance is large, it is possible to make a drawing thinly at the center of the image and densely at the periphery thereof.

A twelfth invention is a storage medium storing an image processing program according to the first invention, wherein the image processing apparatus further comprises an imager, and the image processing program causes the computer to further function as an image reader which reads an image imaged by the imager, wherein the outline detector detects the outline from the image imaged by the image reader.

According to the twelfth invention, it is possible to take a photograph by the imager like a camera and perform a drawing thereon. Here, the image may be a handwritten image, a scanner image, a CG image, etc, other than the camera image.

A thirteenth invention is an image processing method comprising an outline detecting step for detecting an outline from an image; a position-to-be-drawn selecting step which selects a position to be drawn from positions in relation to the outline detected by the outline detecting step, and a drawing step which performs a predetermined drawing at the position selected by the position-to-be-drawn selecting step.

A fourteenth invention is an image processing system comprising: an outline detector for detecting an outline from an image; a position-to-be-drawn selector which selects a position to be drawn from positions in relation to the outline detected by the outline detector; and a drawer which performs a predetermined drawing at the position selected by the position-to-be-drawn selector.

In each of the thirteenth to the fourteenth inventions, similar to the first invention, it is possible to easily perform a predetermined drawing on the positions in relation to the outline irrespective of an instruction from the user.

According to the present invention, it is possible to implement the image processing program, the image processing apparatus, the image processing method and the image processing system which are able to make a predetermined drawing at the outline position of the image irrespective of the user's designation.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 6 is an illustrative view showing a method of detecting an outline from an original image by a filter, FIG. 6(A) shows an original image, FIG. 6(B) shows a movement of the filter, FIG. 6(C) shows a referential pixel of the filter, and FIG. 6(D) shows a factor of the filter;

FIG. 7 is an illustrative view for explaining a relationship between the original image and sections, FIG. 7(A) shows a plurality of sections obtained by dividing the original image, and FIG. 7(B) shows a positional relationship between the original image and each section;

FIG. 8 is an illustrative view showing a table to be referred when a target section is selected, FIG. 8(A) shows a probability table, and FIG. 8(B) shows a factor table;

FIG. 9 is an illustrative view showing an object table to be referred when a drawing is performed;

FIG. 10(A) shows an original image, FIG. 10(B) shows a relationship between the outline and respective sections, and FIG. 10(C) shows an image attached with stars;

FIG. 11 is an illustrative view showing another example of drawing (when the outline is middle), FIG. 11(A) shows an original image, FIG. 11(B) shows a relationship between the outline and respective sections, and FIG. 11(C) shows an image attached with stars;

FIG. 12(A) shows an original image, FIG. 12(B) shows a relationship between the outline and respective sections, and FIG. 12(C) shows an image attached with stars;

FIG. 14 is an illustrative view showing one example of section data, and corresponds to FIG. 10(B);

FIG. 15 is an illustrative view showing another example of the section data, and corresponds to FIG. 11(B);

FIG. 16 is an illustrative view showing a still another example of the section data, and corresponds to FIG. 12(B);

FIG. 25(A) shows an original image and a section, FIG. 25(B) shows a probability table, and FIG. 25(C) shows a factor table;

FIG. 26 is an illustrative view showing one example of drawing (when outline is less) in the modified example in FIG. 25, FIG. 26(A) shows an original image, and FIG. 26(B) shows an image attached with stars;

FIG. 27 is an illustrative view showing another example of drawing (when outline is more) by the modified example in FIG. 25, FIG. 27(A) shows an original image, and FIG. 27(B) shows an image attached with stars;

DETAILED DESCRIPTION OF THE PREFERRED EMBODIMENTS

Figure 1:
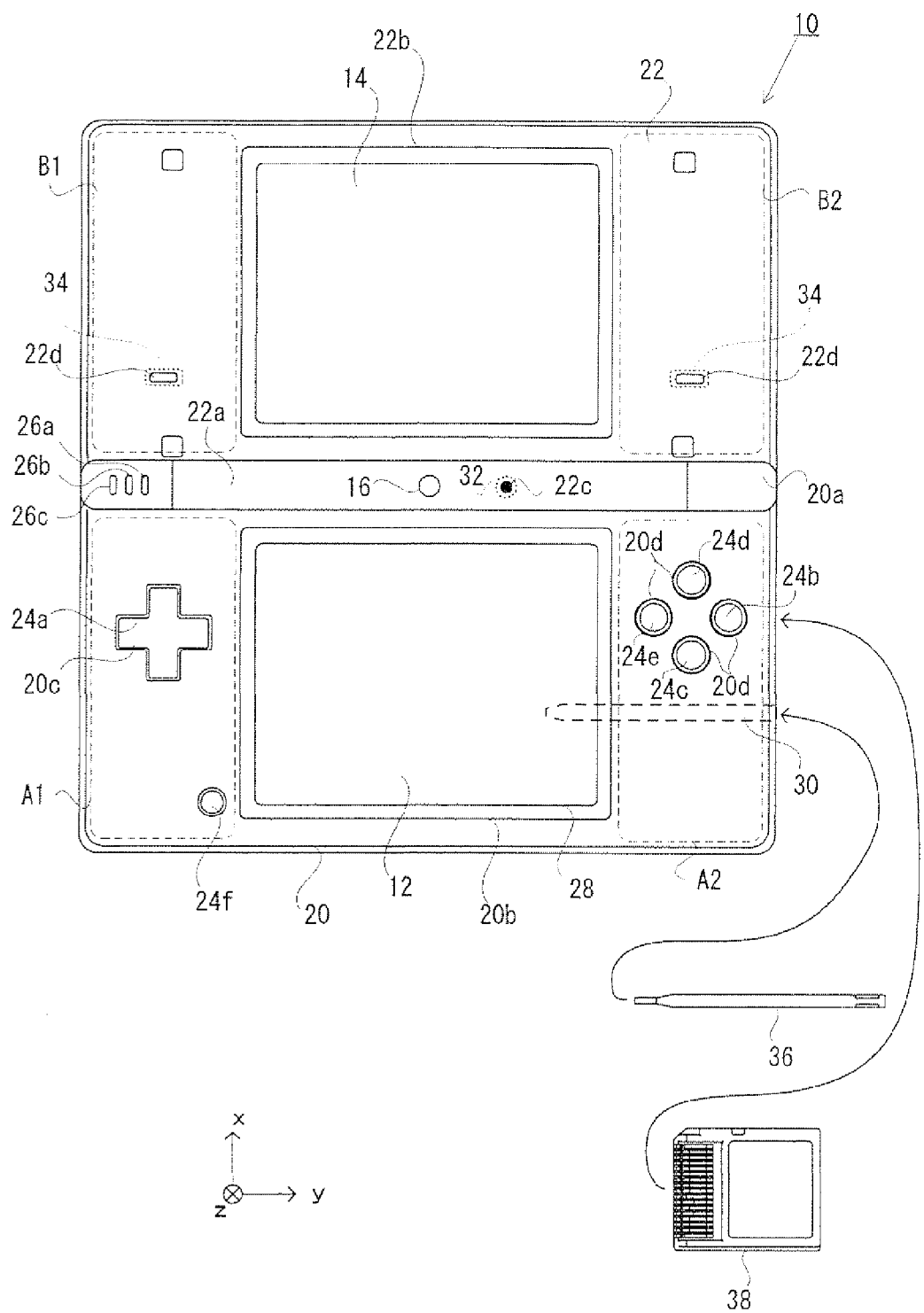
FIG. 1 is an external view of a game apparatus of one embodiment of the present invention, and shows a front surface in an open state.
Figure 2:
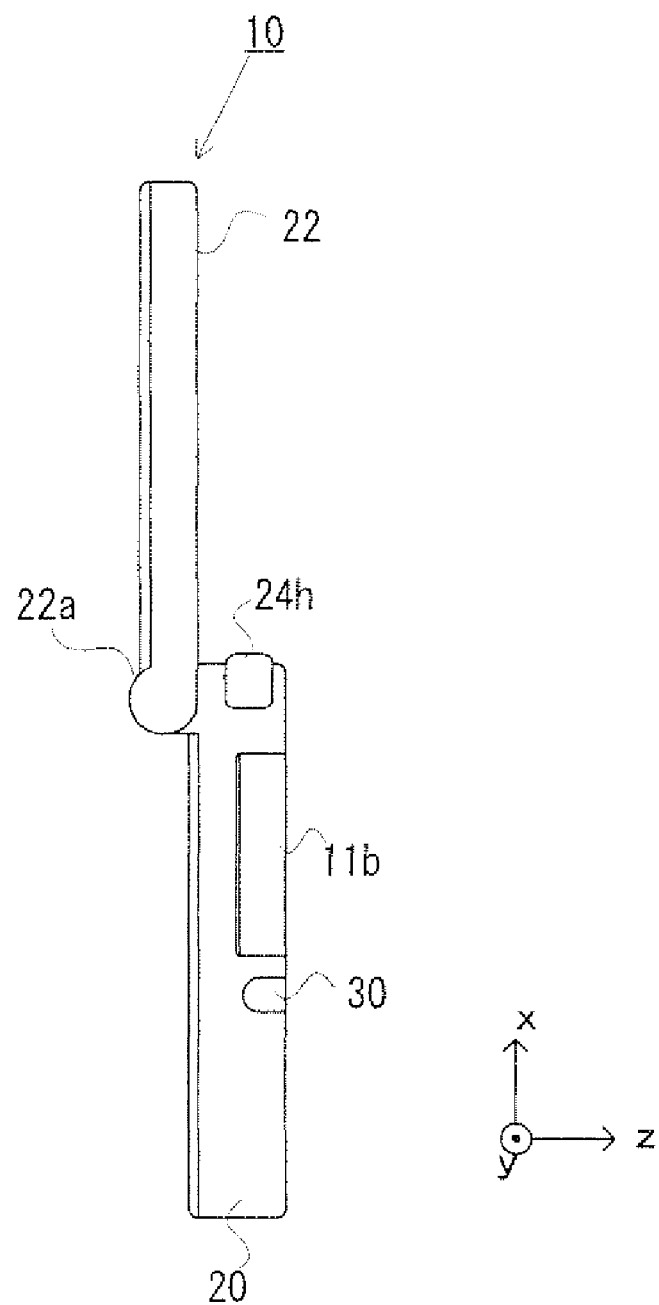
FIG. 2 is an external view of the game apparatus, and shows a side surface thereof in the open state.
Figure 3:
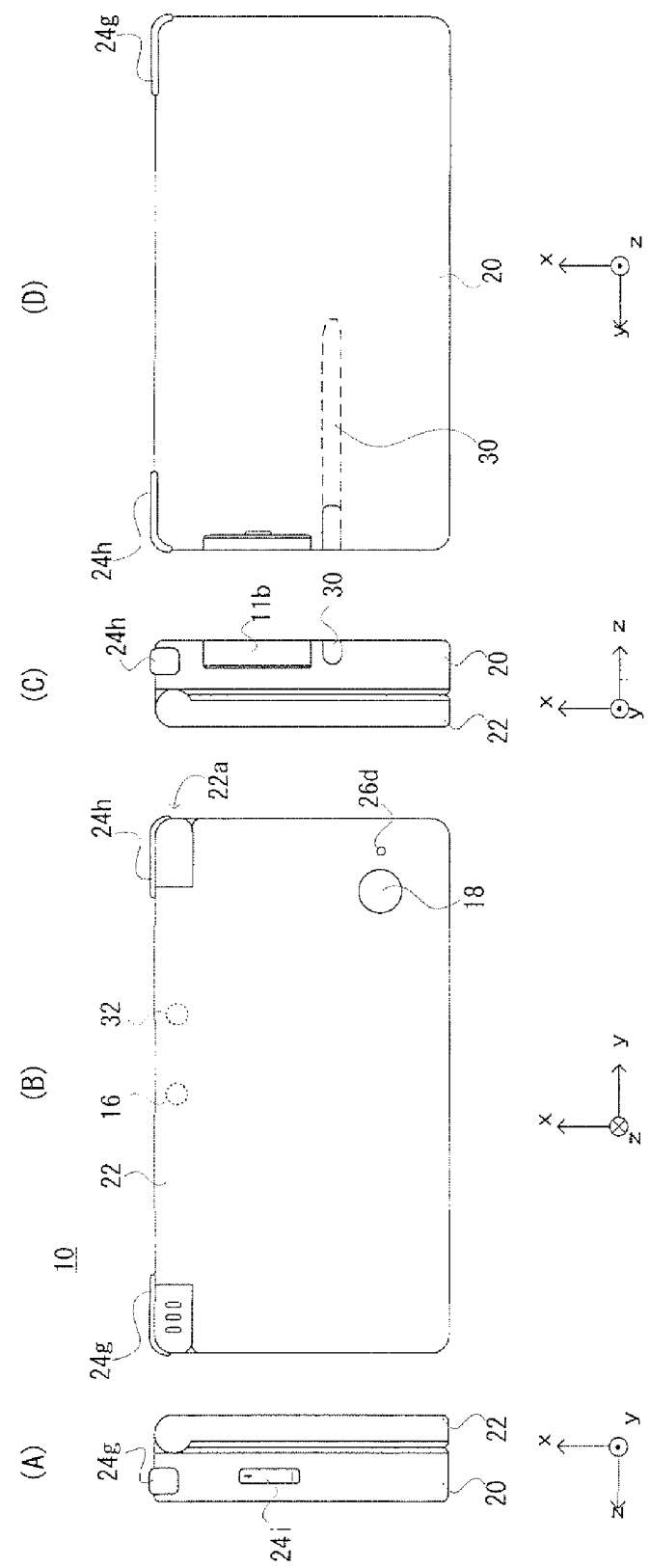
FIG. 3 is an external view of the game apparatus.

In FIG. 1 to FIG. 3, an external view of a game apparatus 10 of one embodiment of the present invention is shown. The game apparatus 10 is a foldable game apparatus, and each of FIG. 1 and FIG. 2 shows the game apparatus 10 in a opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image an image with the camera, display the imaged image and store the data of the imaged image.

The game apparatus 10 is constructed small enough to be held by the user with both hands or one hand even in the open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is supported pivotally at a part of the upper side of the lower housing 20. This makes the game apparatus 10 to take a close state (the angle formed by the lower housing 20 and the upper housing 22 is about 0° (see FIG. 3)) and an open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc. exerted on the hinge as well as the close state and the open state as described above. That is, the upper housing 12 can be fixed with respect to the lower housing 14 at an arbitrary angle.

First, the configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is provided on an inner surface of the lower housing 20. Accordingly, if the game apparatus 10 is not to be used, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electro Luminescence), for example, may be used. Furthermore, the game apparatus 10 can employ a display of an arbitrary resolution. Additionally, in a case that the game apparatus 10 is used as an imaging device, the lower LCD 12 is used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a to 24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1. More specifically, areas for arranging the respective buttons 24a to 24e; button arranging area) are provided.

On the lower housing 20, the respective buttons 24a to 24i and a touch panel 28 are provided as input devices. As shown in FIG. 1, the direction input button 24a, the button 24b, the button 24c, the button 24d, the button 24e, and the power button 24f out of the respective buttons 24a to 24i are provided on the inner surface of the lower housing 20. The direction input button 24a is utilized for a selecting operation, for example, and the respective buttons 24b to 24e are utilized for a decision operation and a cancel operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b to 24e are provided at the other side (right side in FIG. 1) of the lower LCD 12. The direction input button 24a and the buttons 24b to 24e are utilized for performing various operations to the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3 (C) and FIG. 3(A), the volume button 24*i* is provided on the left side surface of the lower housing 20. The volume button 24*i* is utilized for adjusting a volume of a speaker 34 furnished in the game apparatus 10. Furthermore, as shown in FIG. 3(D), the button 24*h* is provided at the right corner of the upper side surface of the lower housing 20. The button 24*g* is provided at the left corner of the upper side surface of the lower housing 20. The both of the buttons 24*g* and 24*h* are utilized for performing an imaging instructing operation (shutter operation) on the game apparatus 10, for example. Alternatively, both of the buttons 24*g* and 24*h* may be made to work as shutter buttons. In this case, a right-handed user can use the button 24*h*, and a left-handed user can use the button 24*g*, capable of improving usability for both of the users. Additionally, the game apparatus 10 can constantly make both of the buttons 24*g* and 24*h* valid as shutter buttons, or the game apparatus 10 is set to be a right-handed use or a left-handed use (the setting is input by the user according to a menu program, etc. and the set data is stored), and when the right-handed use is set, only the button 24*h* is made valid, and when the left-handed use is set, only the button 24*g* may be made valid.

As shown in FIG. 1, the game apparatus 10 is further provided with the touch panel 28 as an input device other than the respective operation buttons 24*a* to 24*i*. The touch panel 28 is set on the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having the same resolution (detection accuracy) as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can accommodate a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

As shown in FIG. 2 and FIG. 3 (C), on the right side surface of the lower housing 20, an openable and closeable cover portion 11*b* is provided. Inside the cover portion 11*b*, a connector (not illustrated) for electrically connecting the game apparatus 10 and the memory card 38 is provided. The memory card 38 is detachably attached to a connector. The memory card 38 is used for storing a program operated in the game apparatus 10 or storing (saving) image data imaged by the game apparatus 10, for example.

As shown in FIG. 1, at the left of the shaft portion 20*a* of the lower housing 20, three LEDs 26*a* to 26*c* are attached. Here, the game apparatus 10 can perform a wireless communication with another appliance in the same kind (not shown), and the first LED 26*a* lights up when a wireless communication is established. The second LED 26*b* lights up while the game apparatus 10 is recharged. The third LED 26*c* lights up when the main power supply of the game apparatus 10 is turned on. Accordingly, by the three LEDs 26*a* to 26*c*, it is possible to inform the user of a communication-established state, a charge state, and a main power supply on/off state of the game apparatus 10.

Figure 4:
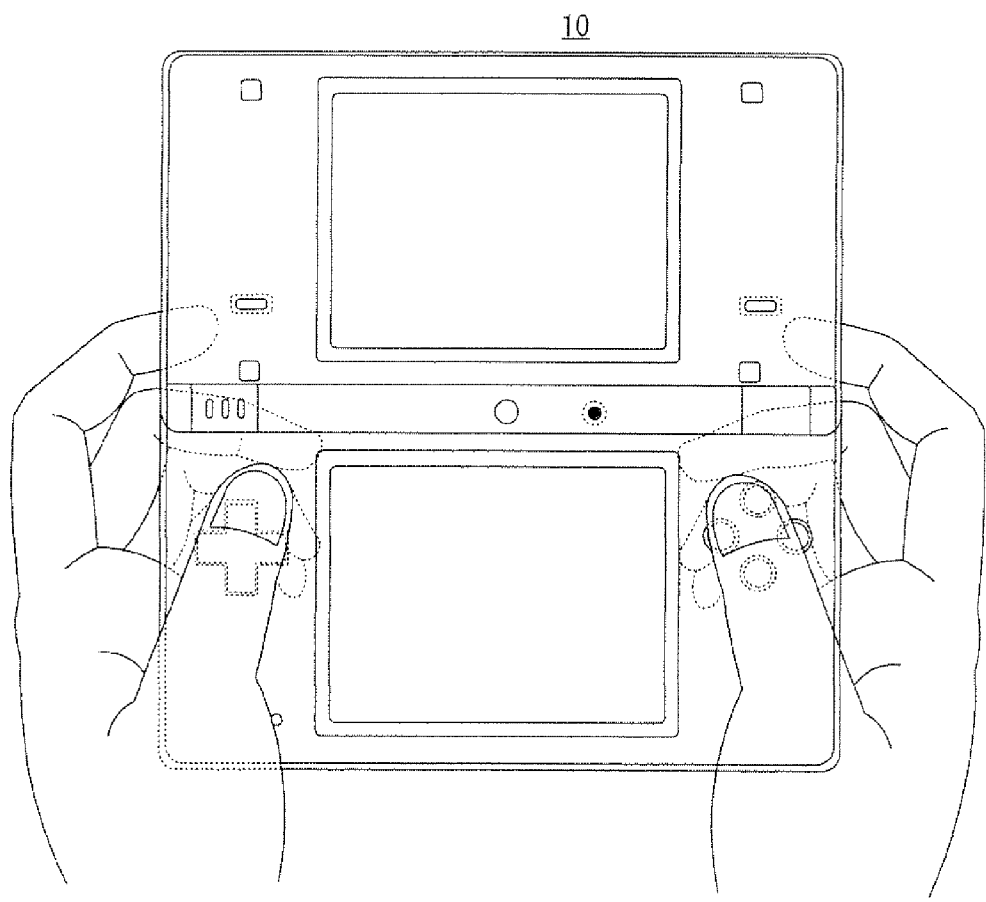
FIG. 4 is an illustrative view showing a state that the game apparatus is held by the user.

As described above, the lower housing 20 is provided with the input device (touch panel 28 and respective buttons 24*a* to 24*i*) for performing an operation input to the game apparatus 10. Accordingly, when utilizing the game apparatus 10, the user can perform an operation on the game apparatus 10 while holding the lower housing 20. FIG. 4 shows a situation in which the user holds the game apparatus 10 with both of the hands. As shown in FIG. 4, the user holds the side surface and the outer surface (surface opposite to the inner surface) of the lower housing 20 with the palms, the middle fingers, the ring fingers and the little fingers of both of the hands in a state that the respective LCDs 12 and 14 are directed to the user. By holding the game apparatus 10 in such a manner, the user can perform operations as to the respective buttons 24*a* to 24*e* with the thumbs, and perform operations as to the buttons 24*g* and 24*h* with the index fingers while holding the lower housing 20.

On the other hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is set to the upper housing 22. The upper LCD 14 takes a horizontally-long shape, and is arranged such that the direction of the long side is coincident with the long side of the upper housing 22. The upper LCD 14 is provided on the inner surface of the upper housing 22 (the inner surface when the game apparatus 10 is in the close state). Accordingly, if the game apparatus 10 is not to be used, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other band, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22*a* formed at the center of the bottom of the upper housing 22. That is, the inward camera 16 is attached at the center of the part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, "the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14. In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set to the open state. Here, since the outward camera 18 is not for imaging the user holding the game apparatus 10, there is less need for being provided at the center of the game apparatus 10.

Furthermore, as shown in FIG. 1 or FIG. 3(B), a microphone 32 is housed in the upper housing 22. More specifically, the microphone 32 is attached to the shaft portion 22a of the upper housing 22. In this embodiment, the microphone 32 is attached around the inward camera 16 (next to the inward camera 16 along the y axis), and specifically attached next to the inward camera 16 in the positive direction of the y axis. Furthermore, a through hole for microphone 22c is mounted to the shaft portion 22a at a position corresponding to the microphone 32 (next to the inward camera 16) such that the microphone 32 can detect a sound outside the game apparatus 10. Alternatively, the microphone 32 may be housed in the lower housing 20. For example, the through hole for microphone 22c is provided on the inner surface of the lower housing 20, specifically, at the lower left (button arranging area A1) of the inner surface of the lower housing 20, and the microphone 32 may be arranged in the vicinity of the through hole for microphone 22c within the lower housing 20. In addition, the microphone 32 is attached in such a direction that its sound collecting direction (direction in which the sensitivity becomes maximum) is approximately in parallel with the imaging direction (optical axis) of the inward camera 16 (in other words, the sound collecting direction and the imaging direction are approximately in parallel with the z axis). Thus, a sound generated within the imaging range of the inward camera 16 is suitably acquired by the microphone 32. That is, detection of a sound input through the microphone 32 and detection of the user by the imaged image by the inward camera 16 can be simultaneously performed, and accuracy of the detections can be improved, at the same time.

As shown in FIG. 3(B), on the outer surface of the upper housing 22, a fourth LED 26d is attached. The fourth LED 26d is attached around the outward camera 18 (at the right side of the outward camera 18 in this embodiment). The fourth LED 26d lights up at a time when an imaging is made with the inward camera 16 or the outward camera 18 (shutter button is pushed). Furthermore, the fourth LED 38 continues to light up while a motion image is imaged by the inward camera 16 or the outward camera 18. By making the fourth LED 26d light up, it is possible to inform an object to be imaged that an imaging with the game apparatus 10 is made (is being made).

Furthermore, the inner surface of the lower housing 22 is formed to be approximately planar. As shown in FIG. 1, at the center of the inner surface, an opening 22b for exposing the upper LCD 14 is formed. The screen of the upper LCD 14 housed inside the upper housing 22 is exposed from the opening 22b. Furthermore, on both side of the aforementioned opening 22b, a sound release hole 22d is formed one by one. Inside the sound release hole 22d of the upper housing 22, a speaker 34 is hosed. The sound release hole 22d is a through hole for releasing a sound from the speaker 34.

Thus, on the inner surface of the upper housing 22, non-display areas (areas B1 and 132 represented by a dotted lines in FIG. 1. More specifically, areas for arranging the speaker 34; speaker arranging areas) are provided on both sides of the opening 22b set at the center of the upper LCD 14. The two sound release holes 22d are arranged at approximately the center of the horizontal direction of each speaker arranging area with respect to the horizontal direction, and at the lower portion of each speaker arranging area with respect to the vertical direction (area close to the lower housing 20).

Here, as described above, by providing the non-display areas on the lower housing 20 and the upper housing 22 at the same positions in the horizontal direction, the game apparatus 10 is configured to help user's holding not only when it is held horizontally as shown in FIG. 4, but also when it is held vertically (a state rotated to left or right by 90° from the state shown in FIG. 4).

As described above, the upper housing 22 is provided with the cameras 16 and 18 which are configured to image an image and the upper LCD 14 as a display means for displaying the imaged image. On the other hand, the lower housing 20 is provided with the input device (touch panel 28 and respective buttons 24a to 24i) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device. In addition, the user performs a sound input over the microphone 32, and the game apparatus 10 can also execute the game processing and application processing other than the game on the basis of the microphone input information.

Figure 5:
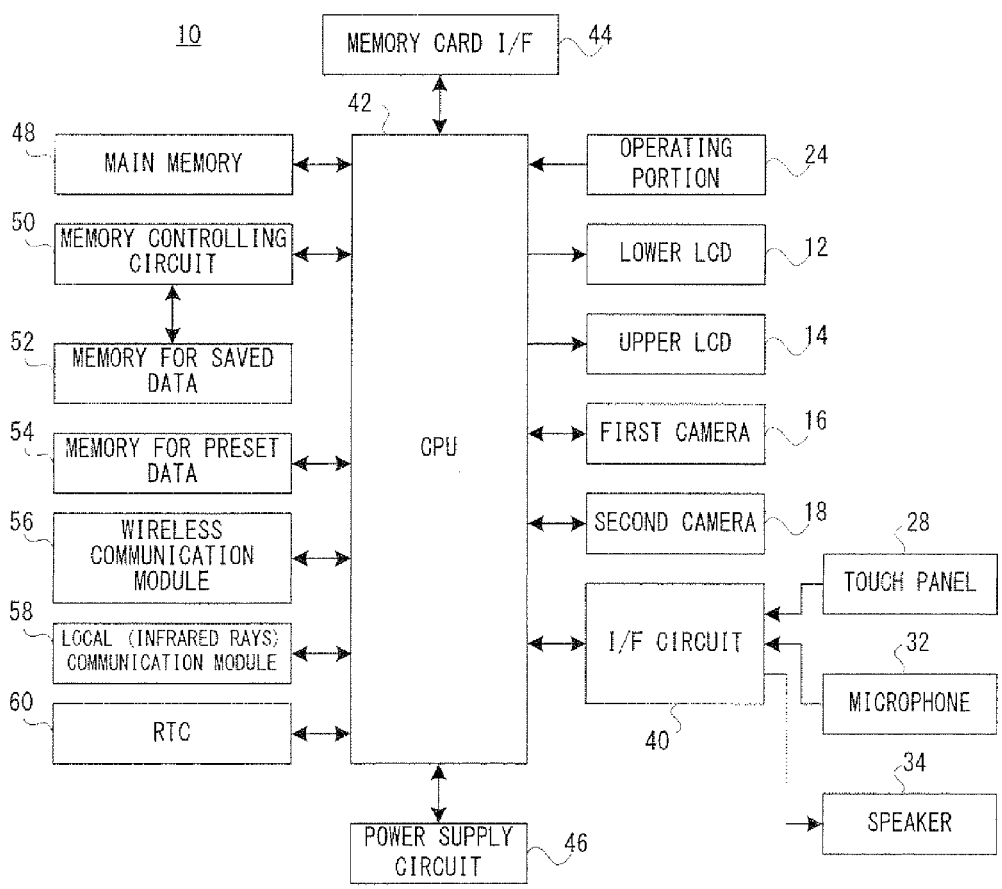
FIG. 5 is a block diagram showing one example of an electric configuration of the game apparatus.

FIG. 5 is a block diagram showing an internal configuration (electronic configuration) of the game apparatus 10. As shown in FIG. 5, the game apparatus 10 includes electronic components, such as a CPU 42, a main memory 48, a memory controlling circuit 50, a memory for saved data 52, a memory for preset data 54, a memory card interface (memory card I/F) 44, a wireless communication module 56, a local communication module 58, a real-time clock (RTC) 60, a power supply circuit 46, and an interface circuit (I/F circuit) 40, etc. Theses electronic components are mounted on an electronic circuit board, and housed in the tower housing 20 (or the upper housing 22 may also be appropriate).

The CPU 42 is an information processor to execute various programs. In a case that the game apparatus 10 is utilized as an imaging device, the program for it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38, and may be acquired from another appliance, etc. by communicating with this another appliance, etc.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the application processing, and stores a program obtained from the outside (memory cards 38, another appliance, etc.) In this embodiment, a PSRAM (Pseudo-SRAM) is used, for example, as a main memory 48. The memory for saved data 52 is a memory means for storing (saving) a program to be executed by the CPU 42, data of an image imaged by the respective cameras 16 and 18, etc. The memory for saved data 52 is configured by a NAND type flash memory, for example. The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory cards 38 attached to the connector according to an instruction from the CPU 42. In this embodiment, the image data imaged by the respective cameras 16 and 18 is written to the memory card 38, and the image data stored in the memory card 38 is read from the memory card 38 and stored in the memory for saved data 52.

The wireless communication module 56 has a function of connecting a wireless LAN compliant with IEEE802.11 b/g standards, for example. Furthermore, the local communication module 58 has a function of performing a wireless communication with the same types of the game apparatuses by a predetermined communication system, such as an infrared communication. The wireless communication module 56 and local communication module 58 are connected to the CPU 42. The CPU 42 can send and receive data over the Internet with other appliances by means of the wireless communication module 56, and can send and receive data with the same types of other game apparatuses by means of the local communication module 58.

It should be noted that the local communication module 58 is contained in the game apparatus 10 in this embodiment, but may be provided to the memory card 38. In this case, the CPU 42 performs a control of the communication via the memory card I/F 44.

Additionally, the CPU 42 is connected with the RTC 60 and the power supply circuit 46. The RTC 60 counts a time to output the same to the CPU 42. The CPU 42 can calculate a current time (date) on the basis of the time counted by the RTC 60, and detects an operation timing as to when an image is to be acquired, etc. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user to output a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data is written to a sound area (not shown) of the main memory 48. If the game apparatus 10 is utilized as a recording device, the audio data stored in the sound area is written to the memory for saved data 52 via the memory controlling circuit 50 thereafter (recorded in the memory card 38a via the memory card I/F 44 as required). Furthermore, the audio data (microphone input information) stored in the sound area is also utilized for various game processing. The touch panel controlling circuit generates touched position data in a predetermined format on the basis of the signal from the touch panel 28 and outputs it to the CPU 42. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 acquires the touch position data to thereby know the position where the input is made on the touch panel 28.

The operating portion 24 is made up of the aforementioned respective buttons 24a to 24i, and connected to the CPU 42. The operation data indicating an input state (whether or not to be pushed) with respect to each of the operation buttons 24a to 24k is output from the Operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output imaged image data to the CPU 42. The CPU 42 writes the image data from each of the cameras 16 and 18 to an image area (not shown) of the main memory 48. In a case that the game apparatus 10 is utilized as an imaging device, the image data stored in the image area is written to the memory for saved data 52 via the memory controlling circuit 50 (and moreover recorded in the memory card 38a via the memory card I/F 44 as required). Furthermore, the image data sorted in the image area can also be utilized for various game processing.

In addition, each of the LCDs 12 and 14 is connected to the CPU 42. Each of the LCDs 12 and 14 displays an image according to an instruction by the CPU 42. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12. If a game is played with the game apparatus 10, a game image is displayed on one or both of the LCD 12 and 14.

When an image management application of this embodiment is executed in the game apparatus 10 configured as described above, image manipulation processing of arranging (drawing) objects stars, etc. at an appropriate position along an outline of a subject, etc. on an image (original image) imaged by each camera 16, 18 can be performed. Here, in the image manipulation processing, effects, such as sharpness, blur, etc. along the outline can be added. Hereafter, the image manipulation processing is explained in detail, but the summary is explained at first.

In the image manipulation processing, an outline 104 of a subject 102 is detected from an original image 100 shown in FIG. 10(A), FIG. 11(A), and FIG. 12(A) in a manner shown in FIG. 6. The original image 100 is divided into a plurality of sections 106 (9×6, for example) in a manner shown in FIG. 7(A).

Next, out of 9×6 sections 106 making up of the original image 100, the sections 106 including the outline 104 are selected as candidate sections 106C (light or dense shaded part), and a target section 106S (dark shaded part) is decided out of the selected candidate sections 106C (see FIG. 10(B), FIG. 11(B), FIG. 12(B)) on the basis of the probability table shown in FIG. 8(A) and the factor table shown in FIG. 8(B). In the original image 100, star objects St1, St2 ... are arranged by making the target section 106S thus decided the center (see FIG. 10(C), FIG. 11(C), FIG. 12(C)).

Thus, the image manipulation processing is roughly made up of four steps of detection of the outline 104, division into the sections 106, selection of the candidate section 106C and decision of the target section 106S. A first point to be noted as to the detection of the outline 104 is a filter factor (see FIG. 6(D)) for calculating a difference value between each pixel and an adjacent pixel. This makes it possible to perform detection with low throughput.

A second point to be noted as to the detection of the outline 104 is to perform calculation of a difference value by the filter factor for each color component (RGB), and take the sum of the difference values as a difference value (A) of the pixel. This makes it possible to increase the accuracy of detection.

A point to be noted as to the selection of the candidate section 106C is to divide the original image 100 into a plurality of sections 106, accumulate the difference values (A) for each section 106, and select the candidate section 106C on the basis of the accumulated difference value (B). This makes it possible to make the throughput and noise less than when the candidate is selected by pixels.

A first point to be noted as to the decision of the target section 106S is to set a probability (p) in correspondence with a total number of the candidate sections 106G selected from the aforementioned all the sections 106 (the number of candidate sections (C)) and to decide the target section 106S out of all the candidate sections 106C based on the probability (p). This makes it possible to control the ratio of the target section 106S to all the candidate sections 106C. For example, the more the number of candidate sections (C) is, the smaller probability (p) is set, and whereby, irrespective of the quantity of the parts of the outline included therein, approximately a fixed number of star objects (St1, St2 ... ) are thus arranged in the original image 100.

A second point to be noted in the decision of the target section 106S is to correct the probability (p) set as described above in correspondence with a distance (d) from the center P of the original image 100 for each candidate section 106C. This makes it possible to control the arrangement of the target section 106S within the original image 100. For example, if a correction is made such that as the candidate section 106C is nearer to the center P, the probability (p) is made low (small), the star object (St1, St2 ... ) is hard to be arranged at or in the vicinity of the center P. On the contrary thereto, if a correction is made such that as the candidate section 106C is nearer to the center P, the probability (p) is made high (large), the star object (St1, St2 ... ) is easy to be arranged at or in the vicinity of the center P.

Next, the detail of the image manipulation processing by the CPU 42 is explained. The CPU 42 first performs outline detecting processing shown in FIG. 6 on the original image 100. FIG. 6 is an illustrative view showing an outline detecting method (differential image creating method) of this embodiment, FIG. 6(A) shows one example of the original image, FIG. 6(B) shows a movement of the filter for performing an outline determination (calculation of the difference value), FIG. 6(C) shows a referential pixel of the filter, and FIG. 6(D) shows a factor of the filter.

The original image 100 which is to undergo the manipulation processing has a size including 180 pixels in a lateral (x) direction and 120 pixels in a longitudinal (y) direction (180×120) as shown in FIG. 6(A), and each pixel (0, 0)-(179, 119) includes three color components of R, G and B. Here, the size of the original image 100 is not restricted to 180×120, and may take an arbitrary value, such as 216×160 (see FIG. 25(A)), 432×320 (see FIG. 30), etc.

As to each pixel (0, 0)-(179, 119) making up of such an original image 100, while moving a filter Flt for calculating a difference between a noticeable pixel and adjacent pixels in a raster scanning manner as shown in FIG. 6(B), the CPU 42 calculates a difference value of the pixel for each color component. The difference values of 180×120 corresponding to 180×120 pixels are obtained from the original image 100 for each color component pixel. An R differential image is made up of the R difference values of 180×120, a G differential image is made up of the G difference values of 180×120, and a B differential image is made up of the B difference values of 180×120.

The CPU 42 generates a differential image (a so-called gray scale) in relation to brightness (Y) by adding the R differential image, the B differential image and the G differential image for each pixel.

Here, in stead of creating the differential image for each RGB and calculating them to obtain the Y differential image, RGB components of each pixel are added to create a Y image in advance, from which a Y differential image may be obtained. In this case, if the subject and the background are, although they are different in color, similar in brightness, detection of the difference (outline) becomes hard.

More specifically, with reference to a noticeable pixel (0) and adjacent three pixels including the pixel below the noticeable pixel (1), the pixel at the right of the noticeable pixel (2) and the pixel at the right below of the noticeable pixel (3) as shown in FIG. 6(C), the filter Flt is equal to an arithmetic operation for multiplying pixel values of 2×2 corresponding to these referential pixels 0-3 of 2×2 by factors of 2×2 as shown in FIG. 6(D), and evaluating the sum of the multiplied results. Accordingly, assuming that pixel values of the referential pixels 0-3 are respectively $X(0)$-$X(3)$, a difference value $\Delta X(0)$ is calculated as in the following (Equation 1).

$$\Delta X(0) = |1 \cdot X(0) - 1 \cdot X(1) - 1 \cdot X(2) + 1 \cdot X(3)| = |(X(0) + X(3)) - (X(1) + X(2))| \quad \text{(Equation 1)}$$

That is, by the filter Flt, the difference between the sum (first summed value) of the noticeable pixel and the lower-right pixel and the sum (second summed value) of the lower pixel and the right pixel is calculated as a difference value (strength of the edge) of the noticeable pixel.

Such a calculation is performed for each color component, and thus, the output of the filter Flt is as in the following (Equation 2)-(Equation 4).

$$\Delta R(0) = (R(0) + R(3)) - (R(1) + R(2)) \quad \text{(Equation 2)}$$

$$\Delta G(0) = (G(0) + G(3)) - (G(1) + G(2)) \quad \text{(Equation 3)}$$

$$\Delta B(0) = (B(0) + B(3)) - (B(1) + B(2)) \quad \text{(Equation 4)}$$

A difference value $A(0)$ of the noticeable pixel is calculated as a total of the difference values of the respective color components defined in the above-described (Equation 2)-(Equation 4) according to following (Equation 5).

$$A(0) = \Delta R(0) + \Delta G(0) + \Delta B(0) \quad \text{(Equation 5)}$$

The calculations according to the aforementioned (Equation 2)-(Equation 5) are performed on each pixel (0, 0)-(179, 119) to thereby obtain a differential image (above-described Y differential image) being made up of the difference values A of 180×120.

On the one hand, the original image 100 is divided into a plurality of sections 106 (9×6 here) as shown in FIG. 7(A). Here, in a case that each section 106 is identified, description is made as a section (1, 1) to a section (9, 6). The CPU 42 accumulates the difference values A each of which is equal to or more than a first threshold value out of the difference values A of 180×120 making up of the difference image data, for each section 106 of 9×6. That is, the difference value A of each pixel is compared with the first threshold value ThA at a time of the accumulation, and the difference value A which is less than the first threshold value ThA is precluded. Thus, accumulated difference values B of 9×6 can be obtained on the basis of the difference image data and the first threshold values ThA.

Here, in this embodiment, in accumulation of the difference values A for each section, the difference value A of each pixel is compared with the first threshold value ThA, and the difference value which is less than the first threshold value ThA is precluded from the difference values A to be accumulated, but without selection by the first threshold value ThA, the difference values A of all the pixels may be regarded as the difference values A to be accumulated. Here, the selection by the first threshold value ThA is hard to be affected by noise.

Furthermore, in this embodiment, in accumulation of the difference value A for each section, the difference value A which is equal to or more than the first threshold value ThA itself is accumulated, but binarization is made such that the difference value A which is less than the first threshold value ThA is "0", and the difference value A which is equal to or more than the first threshold value ThA is "1", and these binarized difference values may be accumulated. This is just as the number of pixels for which the difference value A is equal to or more than the first threshold value (ThA) is calculated for each section 106.

Next, the CPU 42 selects the candidate section 106C out of the sections 106 of 9×6 with reference to the accumulated difference values B of 9×6. More specifically, as to each section 106, the accumulated difference value B is compared with a second threshold value ThB to regard the section for which the accumulated difference value B is larger than the second threshold value ThB as a candidate section 106C. That is, out of 9×6 sections 106, the candidate sections 106C (see FIG. 10(B), for example) including the outline 104 are selected.

Next, the CPU 42 decides a target section 106S as a target for the image manipulation based on a probability from the candidate sections 106C thus selected. More specifically, with reference to the probability table as shown in FIG. 8(A), the probability (p) depending on the number of the candidate sections 106C is decided. According to the probability table, the probability (p) is 40% in a case of C<8, the probability (p) is 35% in a case of 8≦C<10, the probability is 30% in a case of 10≦C<12, and the probability is 25% in a case of 12≦C.

Thus, the more the number of candidate sections (C) is, the lower the probability (p) is, and whereby the average number of the target sections 106S can be contained in a fixed range irrespective of the number of candidate sections (C). In the example shown in FIG. 8(A), if the number of candidate sections (C) is roughly within the range of 5-13, the number of target sections 106S is two or three irrespective of the accurate number of candidate sections (C). Here, the numerical value of two or three is an average value (expected value) based on the probability, and therefore, it is needless to say that the number of target sections 106S is sometimes one or four, or is occasionally equal to or more than zero or five.

Next, the CPU 42 performs a correction of multiplying the probability (p) thus decided by the factor in correspondence with the distance d from the center P of the original image 100 for each candidate section 106C with reference to the factor table as shown in FIG. 8(B). According to the factor table, the probability (p) is 0.25 times as to the candidate section 106C of d<30 (unit is pixel: the same is true for the below), and is the same as to the candidate section 106C of 30≦d (that is, this remains to be the original probability (p)). Here, the factor is two kinds of 0.25 times and 1 time, but three kinds or more may be utilized (see FIG. 25(C), for example).

Here, the distance d from the center P to each section 106 (each candidate section 106C) is calculated from following (Equation 6) by taking the size of the original image 100 as w×h and the coordinates of the center Q of the section 106 as (x, y) as shown in FIG. 7(B).

$$d=\sqrt{\{(x-w/2)2+(y-h/2)2\}} \quad \text{(Equation 6)}$$

In FIG. 7(B) example, the center P is coincident with a barycenter of the original image 100 (intersection point of diagonal lines), and the center Q is coincident with a barycenter of the section 106, but both of them need not be coincident with the barycenters. For example, the center P may be coincident with one pixel positioned near the barycenter of the original image 100, and the center Q is also coincident with one pixel positioned near the barycenter of the section 106. In this case, the distance between PQ is approximately calculated according to the aforementioned (Equation 6).

A correction is made such that the nearer the candidate section 106C is to the center P, the smaller value the probability (p) is set to, and whereby the star object is hard to be arranged at or in the vicinity of the center P of the original image 100.

Next, the CPU 42 decides each candidate section 106C as a target section 106S based on the corrected probability (p). More specifically, an integral value of any one of 0-99 is randomly set to each of the candidate sections 106C, and it is determined whether or not the set value is less than the corrected probability (p). Then, the candidate section 106C for which the set value is less than the corrected probability (p) is decided to be the target section 106S. Thus, the candidate section 106 for which the set value is 25 and the corrected probability (p) is 30% becomes the target section 106S because the set value 25 is less than the probability value "30", but the candidate section 106C for which the set value is 55 and the corrected probability (p) is 40% does not become the target section 106S because the set value 55 is less than the probability value "40".

Accordingly, in a case that all of C pieces of the candidate sections 106C are far away from the center P of the original image 100, the average {C×(p/100)} is decided to be the target section 106S. If there is a candidate section 106C near the center P, the probability (p) of such candidate section 106C is corrected to a smaller value to make the average number of the target section 106S less than {C×(p/100)}.

Here, in a case that an approximately constant number of target sections 106S are to be ensured irrespective of the positional relationship between the center P and each candidate section 106C, the probability of the candidate section 106C which is near the center P may be corrected to a smaller value whereas the probability of the candidate section 106C which is far away from the center P may be corrected to a larger value. In the factor table shown in FIG. 8(B), for example, if the factor corresponding to 30≦d is 1.25 times, fluctuations in the average number incident to the correction is reduced.

Next, the CPU 42 randomly decides a manner of the star object to be drawn on the basis of the object table as shown in FIG. 9 as to each target section 106S. In the object table, as to a plurality of star objects capable of being drawn, the object number (1, 2 . . . ) and the manner (size, shape, color, brightness, etc.) are registered. Here, the star object can be cyclically flashed, changed in color, or rotated, and in such a case, a flashing cycle, a shading pattern, a rotational velocity, etc, may be included in the manner.

Then, the CPU 42 draws the star objects St1, St2 . . . in the manner decided as described above at the position of each target section 106S decided as described above in the original image 100. In drawing, the star object is drawn such that its center is coincident with the pixel (center pixel) at the center Q or in the vicinity thereof of the target section 106S. However, it is not restricted thereto, and "the upper right of the target section 106S" and "the center or the upper right of the star object" may be coincident with each other. Alternatively, there is another method of making the average position (barycenter) of the pixels making up of the outline within the target section 106S and the center of the star object coincident. According to this method, when the section 106 is made up of a lot of pixels, out of the pixel group making up of the section 106, the arrangement position of the star object can be set to be fit for the polarization of the pixels making up of the outline.

Figure 10:
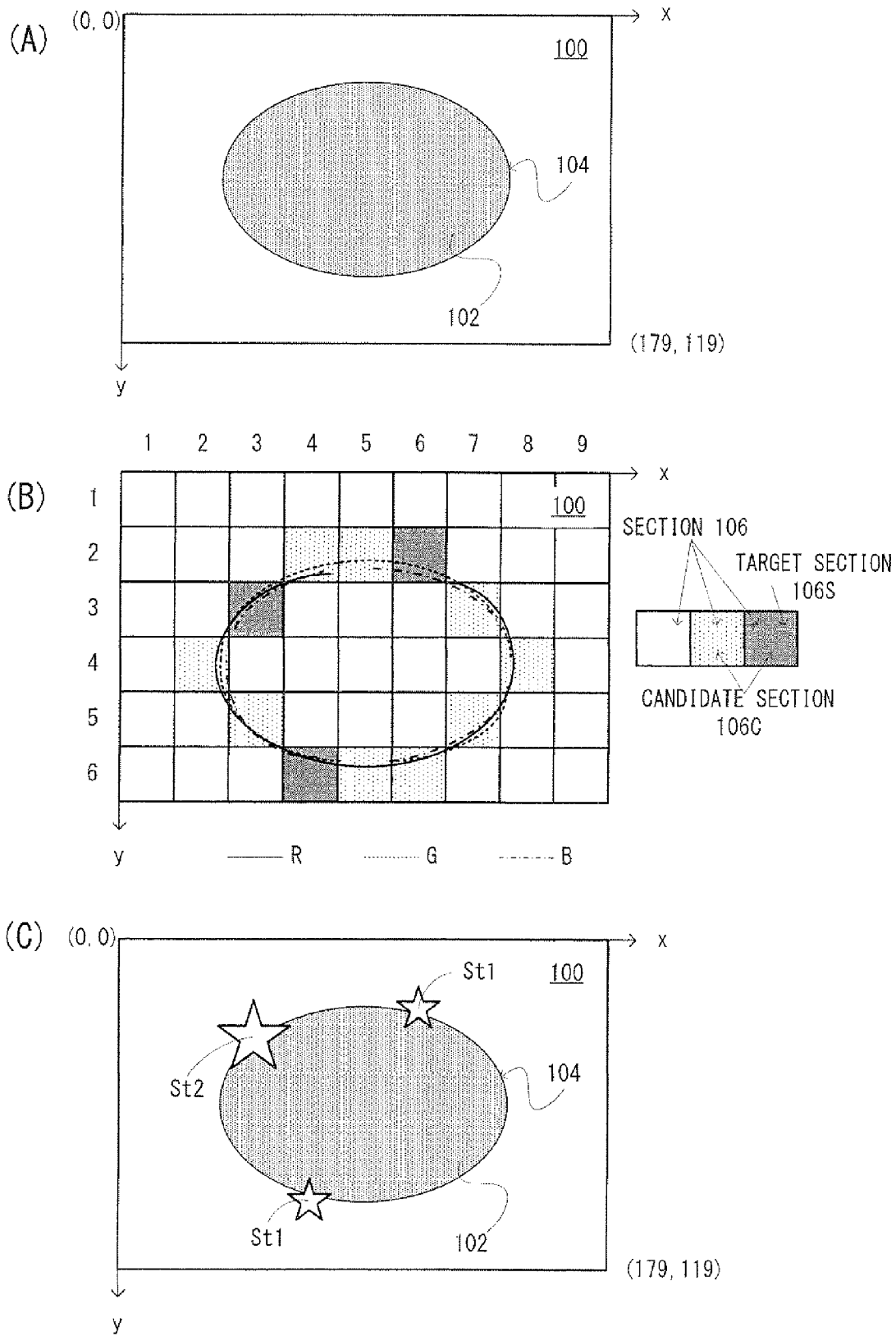
FIG. 10 is an illustrative view showing one example of drawing (when the outline is more)
Figure 12:
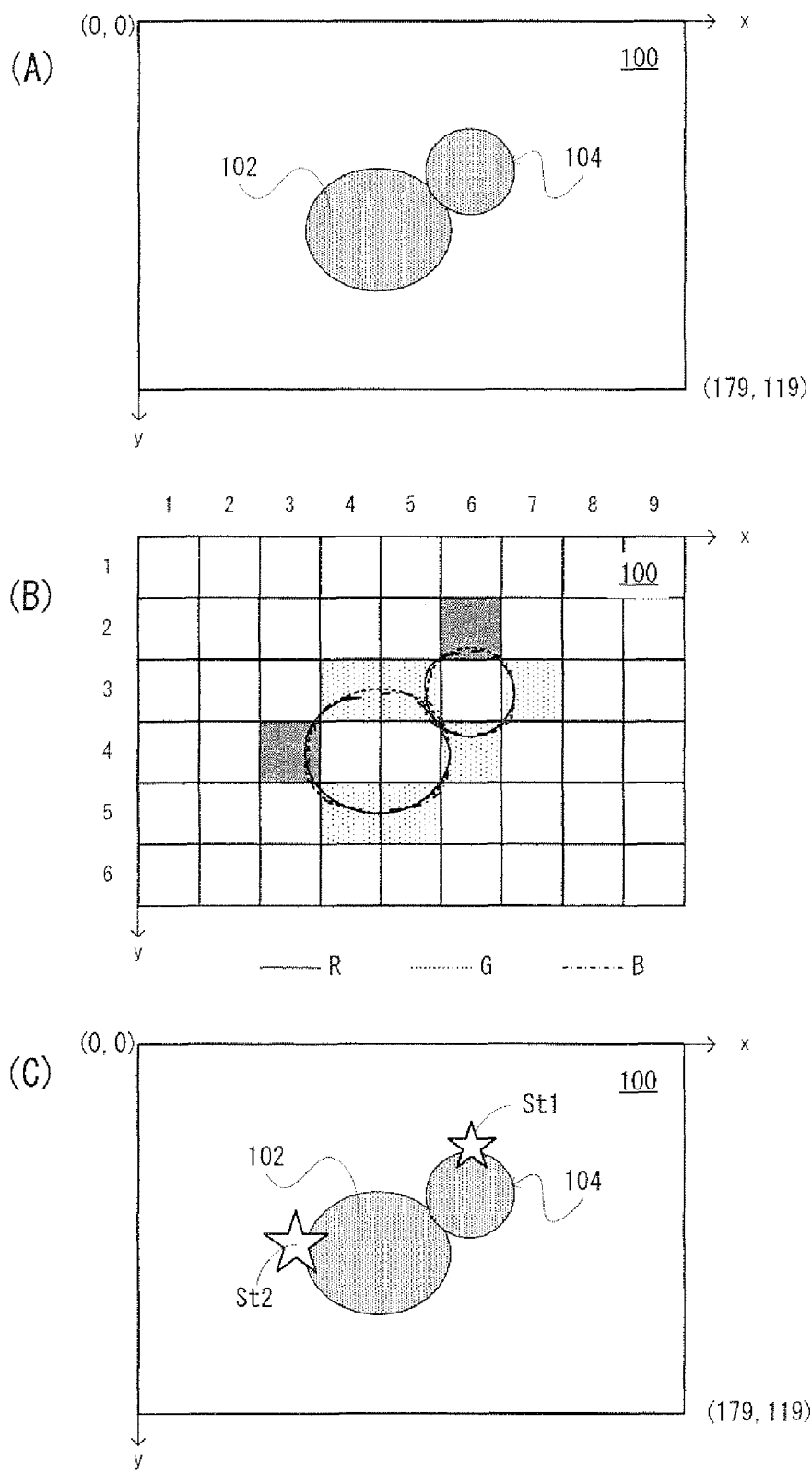
FIG. 12 is an illustrative view showing a still another example of drawing (when the outline is less)

The detailed example of the image manipulation processing as described above is shown in FIG. 10-FIG. 12. In FIG. 10-FIG. 12, the subject 102 included in the original image 100 is different in size and shape.

Referring to FIG. 10, when outline detecting processing is performed on the original image 100 as shown in FIG. 10(A), three outlines (more specifically, an R differential image, a G differential image and a B differential image respectively including an R outline, a G outline and a B outline) as shown by solid lines R, dotted lines G and alternate long and short dashed lines B as shown in FIG. 10(B) can be obtained. Next, along these three outlines (more specifically, on the basis of a Y differential image obtained by adding the R differential image, the G differential image and the B differential image for each pixel), a series of sections (4, 2), (5, 2), (6, 2), (3, 3), (7, 3), (2, 4), (8, 4), (3, 5), (7, 5), (4, 6), (5, 6) and (6, 6) are selected as candidate sections 106C.

In this case, twelve candidate sections 106C are selected (C=12), and thus, the probability is decided to be 25% (p=25) from the probability table in FIG. 8(A). Furthermore, either candidate section 106C has the distance from the center P being equal to or more than 30 pixels (d≧30), and therefore, the factor is decided to be the same from the factor table in FIG. 8(B). Accordingly, any candidate section 106C is decided to be a target section 106S at a probability of 25%, and the three candidate sections 106C out of all the twelve candidate sections 106C become the target sections 106S on average.

Assuming that respective candidate sections 106C (6, 2), (3, 3) and (4, 6) become the target section 106S, the manner of the start object is randomly decided from the object table shown in FIG. 9 as to each of the three target sections 106S. As a result, when the manner of the object number 1 (small star) is assigned to the target section 106S of (6, 2), the manner of the object number 2 (large star) is assigned to the target section 106S of (3, 3), and the manner of the object number 1 (small star) is assigned to the target section 106S of (4, 6), a small star object St1 is drawn at the position of the target section 106S of (6, 2), a large star object St2 is drawn at the position of the target section 106S of (3, 3), and a small star object St1 is drawn at the position of the target section 106S of (4, 6) on the original image 100 as shown in FIG. 10(C).

Next, referring to FIG. 11, when the outline detecting processing is performed on the original image 100 shown in FIG. 11(A), three outlines shown by solid lines R, dotted line G and alternate tong and the short dashed lines B as shown in FIG. 11(B) can be obtained. Next, a series of sections (4, 2), (5, 2), (6, 2), (3, 3), (7, 3), (3, 4), (7, 4), (4, 5), (5, 5) and (6, 5) are selected as candidate sections 106C along these three outlines.

In this case, the ten candidate sections 106C are selected (C=10), and thus, the probability is decided to be 30% (p=30). Furthermore, any candidate section 106C has a distance from the center P being equal to or more than 30 pixels (d≧30), and therefore, the factor is set to the same. Accordingly, any candidate section 106C is decided to be the target section 106S at the probability of 30%, and thus, the three candidate sections 106C out of all the ten candidate sections 106C become the target sections 106S on average.

For example, assuming that respective candidate sections 106C (4, 2), (7, 3) and (6, 5) become the target sections 106S, the manner of the star object is randomly decided as to each of these three target sections 106S. As a result, when the manner of the object number 2 (large star) is assigned to the target section 106S of (4, 2), the manner of the object number 2 (large star) is assigned to the target section 106S of (7, 3), and the manner of the object number 1 (small star) is assigned to the target section 106S of (6, 5), the large star object St2 is drawn at the position of the target section 106S of (4, 2), the large star object St2 is drawn at the position of the target section 106S of (7, 3), and the small star object St1 is drawn at the position of the target section 106S (6, 5) in the original image 100 as shown in FIG. 11(C).

Next, referring to FIG. 12, when the outline detecting processing is performed on the original image 100 shown in FIG. 12(A), three outlines shown by solid lines R, dotted lines G and alternate long and short dashed lines B in FIG. 12(B) can be obtained. Next, a series of sections (6, 2), (4, 3), (5, 3), (7, 3), (3, 4), (6, 4), (4, 5) and (5, 5) are selected as candidate sections 106C along these three outlines.

In this case, the eight candidate sections 106C are selected (C=8), and thus, the probability is decided to be 35% (p=35). Furthermore, the distance from the center P to each of the candidate sections 106C is less than 30 pixels (d<30) as to each of the candidate sections 106C of (4, 3), (5, 3) and (6, 4), and is equal to or more than 30 pixels (30≦d) as to each of the candidate sections 106 C of (6, 2), (7, 3), (3, 4), (4, 5) and (5, 5). Thus, the probability of the former, that is, each candidate section 106C being d<30 is corrected to 0.25 times (=8.75%) of 35%, and the probability of the latter, that is, each candidate section 106Cb being 30≦d is corrected to the same as 35% (=35%). Accordingly, 2.0125 (=3×0.0875+5×0.35) candidate sections 106C out of all the eight candidate sections 106C become the target sections 106S on average (here, the average number in a case that the probability correction is not performed is 2.8).

Thus, the two out of the five candidate sections 106C being p=35 often become the target section 106S. Here, it is needless to say that the number of target sections 106S is sometimes three, or is infrequently one or equal to or more than four, and the target section 106S decided from the candidate section C of p=8.75 may be included in the target sections 106S.

For example, assuming that each of the candidate sections 106C of (6, 2) and (3, 4) become the target section 106S, the manner of the star object is decided as to each of these two target sections 106S. As a result, when the manner of the object number 1 is assigned to the target section 106S of (6, 2), and the manner of the object number 2 is assigned to the target section 106S of (3, 4), a small star object St1 is drawn at the position of the target section 106S of (6, 2), and a large star object St2 is drawn at the position of the target section 106S of (3, 4) in the original image 100 as shown in FIG. 12(C).

Thus, in the original image 100, an appropriate number of star objects St1, St2 . . . are arranged at appropriate positions along the outline 104 irrespective of the size and shape of the subject 102 and moreover, the length of the outline 104.

Figure 13:
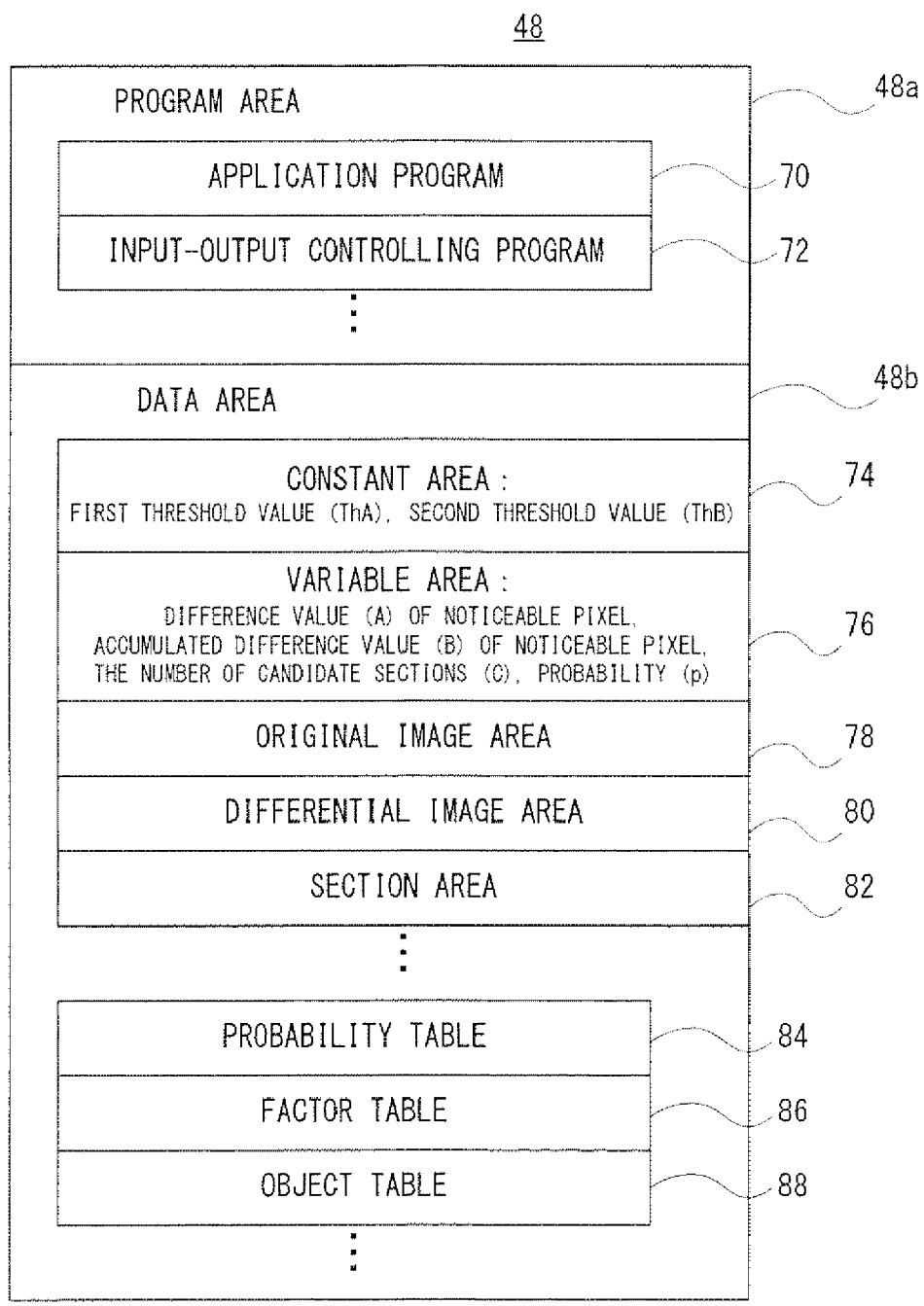
FIG. 13 is an illustrative view showing a memory map of a main memory.

The operation as described above is implemented by executing a flowchart shown in FIG. 17-FIG. 21 by the CPU 42 of the game apparatus 10 on the basis of the program and data shown in FIG. 13 which are stored in the main memory 48.

That is, when the image management application of this embodiment is executed, a program area 48a and a data area 48b are formed in the main memory 48, and in the program area 48a, an application program 70, an input-output controlling program 72, etc. are stored, as shown in FIG. 13.

The application program 70 is a main software program for implementing the image management application by controlling the various pieces of hardware (12-40, 44-60) via the CPU 42, and corresponds to the flowchart shown in FIG. 17-FIG. 21. The input-output controlling program 72 is a sub software program to be utilized by the application program 70, and implements a touch input, a button input, an image output, etc. by mainly controlling the lower LCD 12, the operating portion 24, the I/F circuit 40, etc.

The data area 48b includes a constant area 74, a variable area 76, an original image area 78, a differential image area 80, a section area 82, etc. In the constant area 74, constants to be referred by the application program 70, such as the first threshold value (ThA) in relation to the difference value (A), the second threshold value (ThB) in relation to the accumulated difference value (B) are stored. In the variable area 76, variables to be controlled by the application program 70, such as the difference value (A), the accumulated difference value (B), the number of candidate sections (C), and the probability (p) are stored. In the original image area 78, the original image (100: see FIG. 10(A), FIG. 11(A), FIG. 12(A), etc.) to be managed or manipulated by the application program 70 is stored. In the differential image area 80, a differential image (solid lines R, dotted lines G and alternate long and short dashed lines B: see FIG. 10(B), FIG. 11(B), FIG. 12(B), etc.) to be arranged when an image manipulation is performed by the application program 70 is stored. In the section area 82, section data to be created when the image manipulation is performed by the application program 70 is stored.

In the data area 48b, the probability table 84 shown in FIG. 8(A), the factor table 86 shown in FIG. 8(B), and the object table 88 shown in FIG. 9 are also stored.

In FIG. 14, FIG. 15 and FIG. 16, the specific examples of the section data stored in the section area 82 are shown. Here, the section data in FIG. 14 is data in relation to the section 106 of 9×6 shown in FIG. 10(B), the section data in FIG. 15 is data in relation to the section 106 of 9×6 shown in FIG. 11(B), and the section data in FIG. 16 is data in relation to the section 106 of 9×6 shown in FIG. 12(B).

The section data includes a section number, a position, a distance (d), an accumulated difference value (B), a candidate flag, a probability (p), a target flag and an object number, for each section 106.

The section number is a number for identifying each section 106, and described as (1, 1), (2, 1) . . . (9, 6). The position is coordinates of pixels indicating an upper left and a lower right of each section 106. For example, the section (1, 1) is described as (0, 0)-(19, 19), and the section (4, 2) is described as (60, 20)-(79, 39). The distance is a distance (d: see FIG. 7(B)) from the center P of the original image 100 to the center Q of each section 106. For example, the section (1, 1) is described as 94, and the section (4, 2) is described as 36.

The accumulated difference value (B) is a value obtained by accumulating the difference values (A) being equal to or more than the first threshold value (ThA) out of 20×20 difference values (A) included in the respective sections 106. The candidate flag is a flag for determining whether or not each section 106 is the candidate section 106C, and turned between "ON" and "OFF" on the basis of a comparison between the accumulated difference value (B) and the second threshold value (ThB). Here, the "ON" means that each section is the candidate section 106C, and the "OFF" means that each section is not the candidate section 106C (non candidate section).

The probability (p) is a probability at which each candidate section 106C is decided as a target section 106S, and is set to the vale corresponding to the number of candidate sections (C) with reference to the probability table 84 (see FIG. 8(A)). The probability (p) thus set is corrected with reference to the factor table 86 (see FIG. 8(B)). The target flag is a flag indicating whether or not each section 106 is the target section 106S, and turned "ON" and "OFF" on the basis of the corrected probability (p). Here, the "ON" here indicates that each section 106 is the target section 106S, and the "OFF" indicates that each section 106 is not the target section 106S (non target section).

Then, the object number is a number indicating the object to be drawn in each target section 106S, and decided from the numbers 1, 2 . . . registered in the object table 88 (see FIG. 9).

Figure 17:
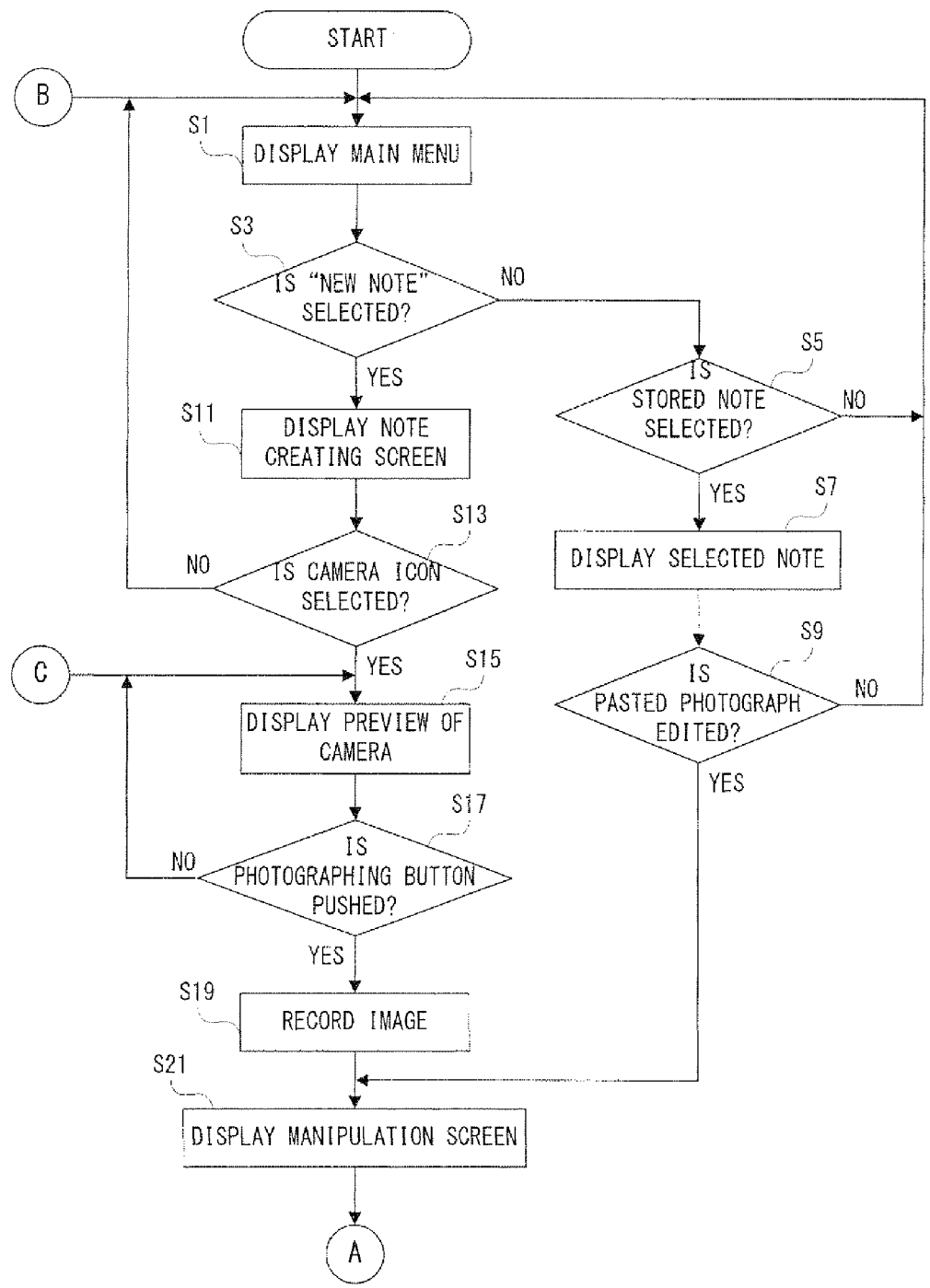
FIG. 17 is a flowchart showing a part of an operation by a CPU.
Figure 22:
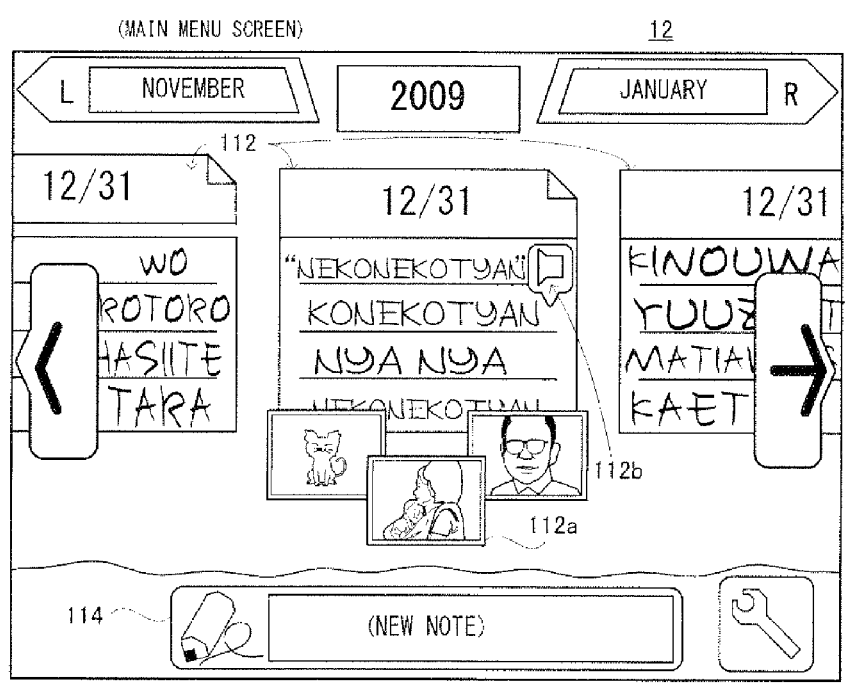
FIG. 22 is an illustrative view showing one example of a main menu screen.

Referring to FIG. 17, when the application program 70 is activated, the CPU 42 first displays a main menu screen on the LCD 12 as shown in FIG. 22 in a step S1. The main menu screen includes three sheets of "stored note" 112 and a "new note" icon 114. In each of the three sheets of "stored note" 112, a handwritten character is described, and in any one of the sheets, a photograph 112a and a voice icon 112b are pasted.

Next, it is determined whether or not the "new note" icon 114 is selected in a step S3, and if "NO", the process shifts to a step S5 to further determine whether or not the "stored note" 112 is selected. If "NO" in the step S5 as well, the process returns to the step S1 to repeat the same processing.

When any one of the "stored notes"112 is touched on the main menu screen, "YES" is determined in the step S5, and the process proceeds to a step S7. In the step S7, the selected "stored note" is displayed on the LCD 12, and in a next step S9, it is determined whether or not editing the pasted photograph 112a is to be performed. If any photograph 112a is selected, the process proceeds to a step S21 (described later). If the photograph 112a is not pasted to the selected "stored note"112, if the voice icon 112b is selected, or if a canceling operation is performed, "NO" is determined in the step S9, and the process returns to the step S1. Although not illustrated, in a case that the voice icon 112b is selected, a corresponding voice (voice memo) is output from the speaker 34.

Figure 23:
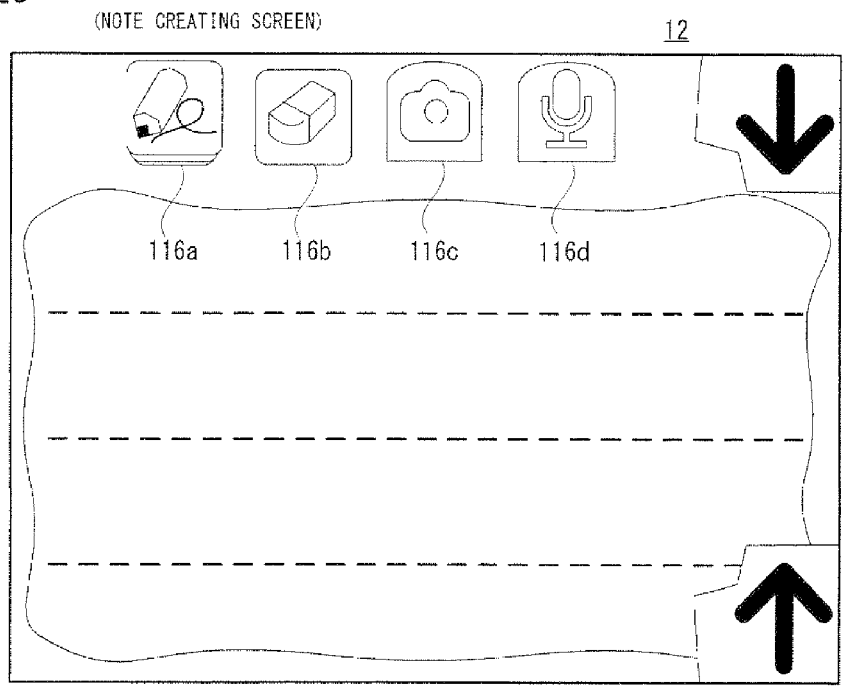
FIG. 23 is an illustrative view showing a note creating screen.

When the "new note" icon 114 is selected on the main menu screen, "YES" is determined in the step S3, and the process proceeds to a step S11. In the step S11, a note creating screen as shown in FIG. 23 is displayed on the LCD 12. The note creating screen includes a "pencil" icon 116a, an "eraser" icon 116b, a "camera" icon 116c, a "microphone" icon 116d, etc.

Next, in a step S13, it is determined whether or not the "camera" icon 116c is selected, and if "YES", the process proceeds to a step S15 whereas if "NO", the process returns to the step S1. Here, that "NO" is determined in the step S13 is a case that the icon (116a, 116b or 116d) other than the "camera" is selected, or a canceling operation is performed. Although not illustrated in the drawings, in a case that the icon other than "camera" is selected, after processing corresponding to the selected icon (handwriting input, cancellation of an input, sound input, option setting, etc.) is executed, processing such as storing, etc. is performed, and then, the process returns to the step S1.

Figure 24:
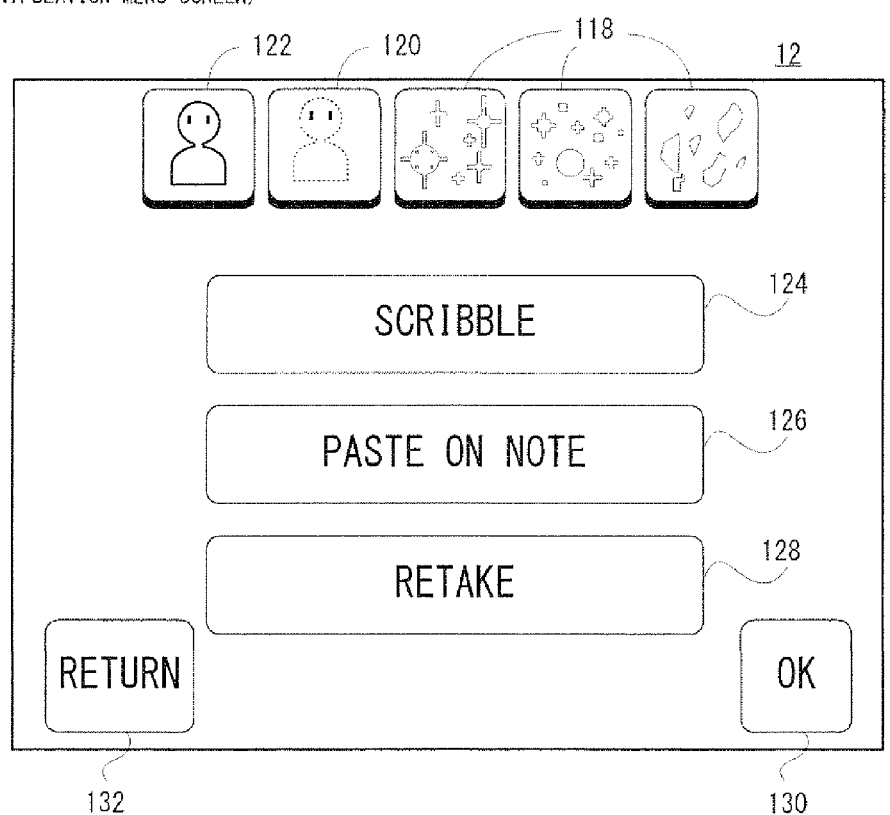
FIG. 24 is an illustrative view showing one example of a manipulation menu screen.

In the step S15, a preview (through image from the camera 16 or 18) of the camera is displayed on the LCD 12, and in a next step S17, it is determined whether or not the photographing button (button 24b, for example) is pushed. If "NO" in the step S17, a process returns to the step S15 to repeat the same processing. If "YES" in the step S17, an image is recorded in the memory card 38a in a step S19, and the process proceeds to the step S21 to display a manipulation menu screen as shown in FIG. 24 on the LCD 12. On the upper LCD 14, the image recorded in the step S19 is displayed and is constantly updated with the image which undergoes image processing according to an instruction from the image processing such as the filter, etc. as described later.

On the manipulation menu screen, three kinds of icons, such as a "crystal filter" icons 118, a "blur" icon 120 and a "sharpness" icon 122, a "scribbling" button 124, a "pasting on a note (storing)" button 126, a "retaking" button 128, a "OK" button 130 and a "returning" button 132, etc. are included. Here, as to the three kinds of "crystal filter" icon, the manner of objects drawn in the image processing (stars and snows, even in the same snow, hexagonal, cross, etc.) are merely different, and thus, they are not especially identified one from another below.

Figure 18:
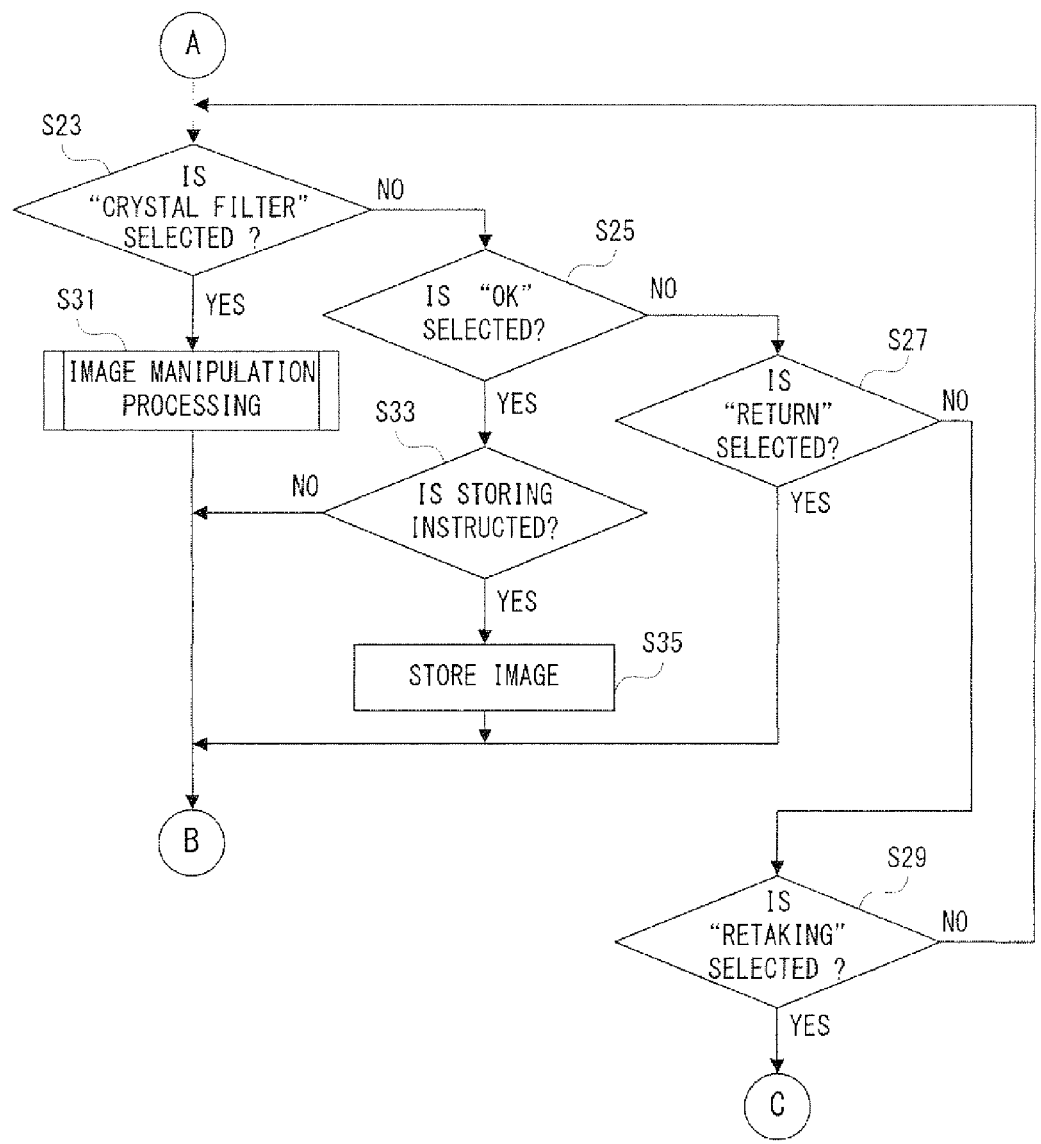
FIG. 18 is a flowchart showing another part of the operation by the CPU.

Referring to FIG. 18, through a loop from steps S23 to S29, it is determined which item is selected on the manipulation menu screen. More specifically, it is determined whether or not the "crystal filter" is selected in the step S23, it is determined whether or not the "OK" or the "pasting on the note" is selected in the step S25, it is determined whether or not the "return" is selected in the step S27, and it is determined whether or not the "re-taking" is selected in the step S29. If "NO" in either steps S23-S29, the processing is circulated through the loop until a canceling operation is performed.

When the "crystal filter" icon 118 is selected on the manipulation menu screen, "YES" is determined in the step S23, and the process proceeds to a step S31. In the step S31, image manipulation processing (see FIG. 19-FIG. 21: described later) corresponding to the "crystal filter" is executed, and then, the process returns to the step S1. When the "OK" button 130 or the "pasting on the note" button 126 is pushed, "YES" is determined in the step S25, and the process proceeds to a step S33 to display a dialogue for further determining whether or not storing is instructed. When the user instructs that storing is actually to be performed, the image is stored in a step S35, and the process returns to the step S1.

When the "return" button 132 is pushed on the manipulation menu screen, "YES" is determined in the step S27, and the process returns to the step S1. Here, the image recorded in the step S19 may be discarded. When the "retaking" button 128 is pushed, "YES" is determined in the step S29, and the process returns to the step S15.

Although not shown in the flowcharts, when the "blur", the "sharpness", or the "scribbling" is selected, image processing corresponding to each of them is executed. These processing are not a subject matter of this embodiment, and thus, the explanation is omitted. Here, in another embodiment, in the image processing corresponding to the "blur" or the "sharpness", similar to the crystal filter", selection of the candidate section 106C along the outline 104 and decision of the target section 106S based on the probability (p) in correspondence with the number of candidate sections (C) are performed, and "blur" or "sharpness" can be (locally) added to the decided target section 106S.

Figure 19:
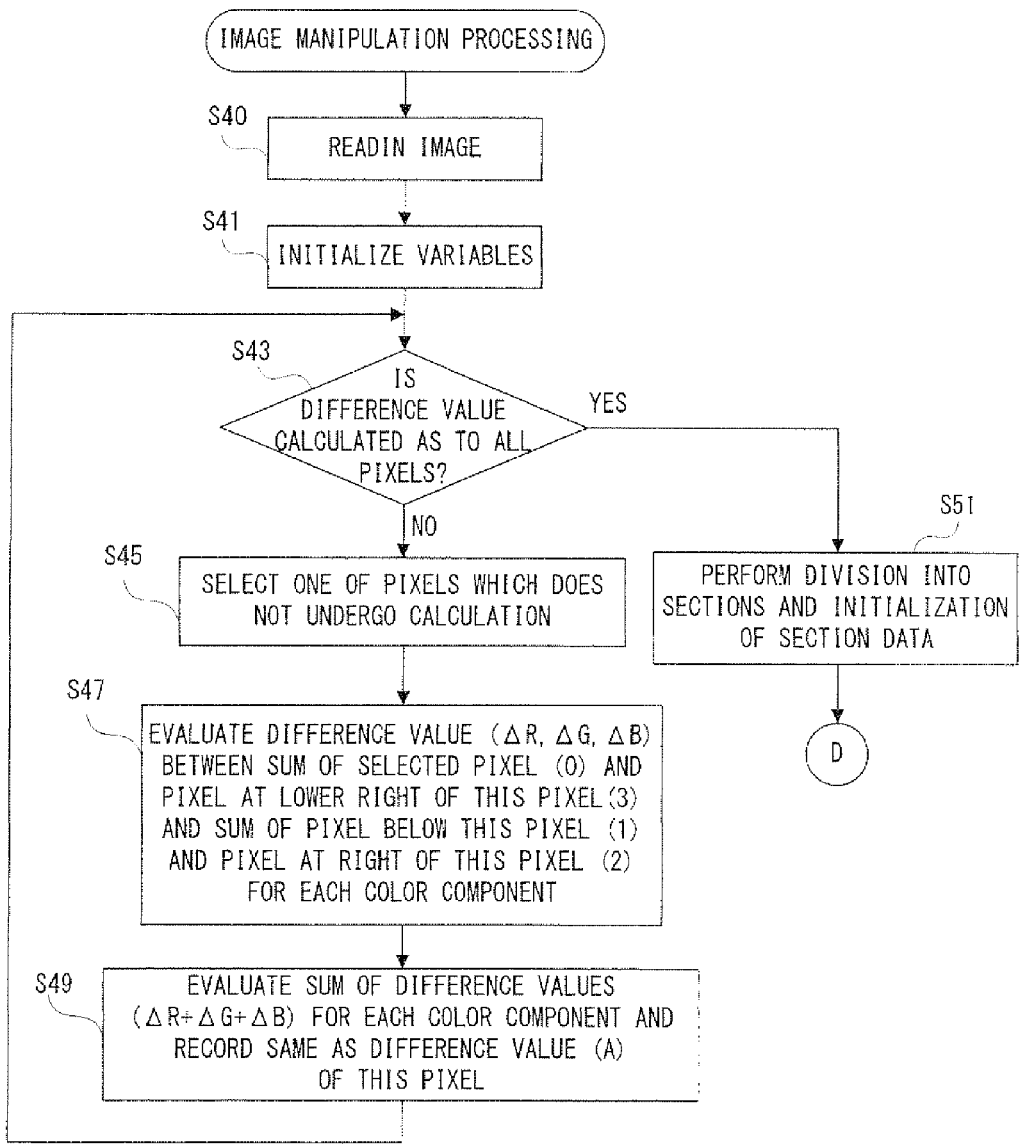
FIG. 19 is a flowchart showing a still another part of the operation by the CPU.
Figure 20:
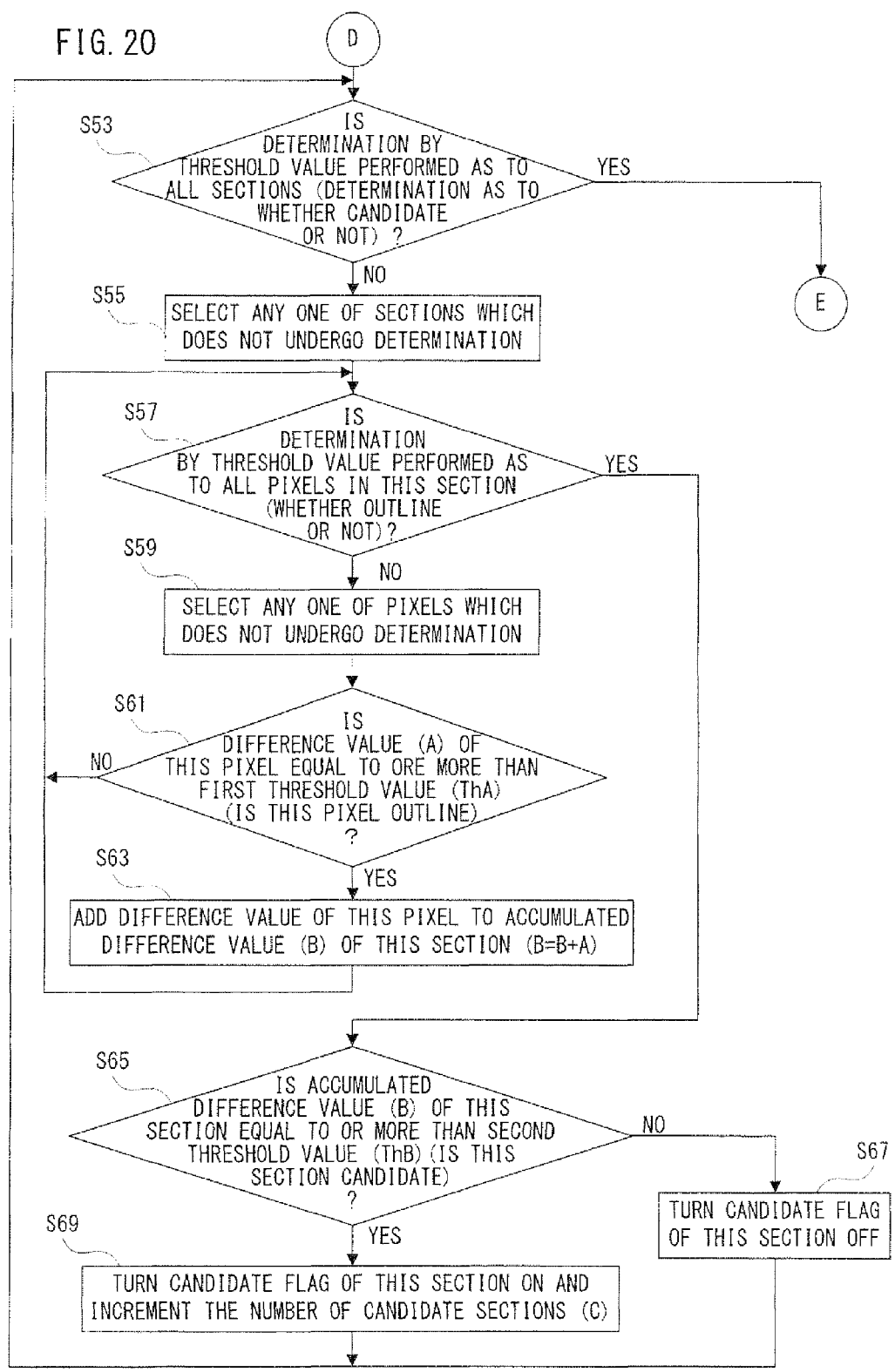
FIG. 20 is a flowchart showing a further part of the operation by the CPU.
Figure 21:
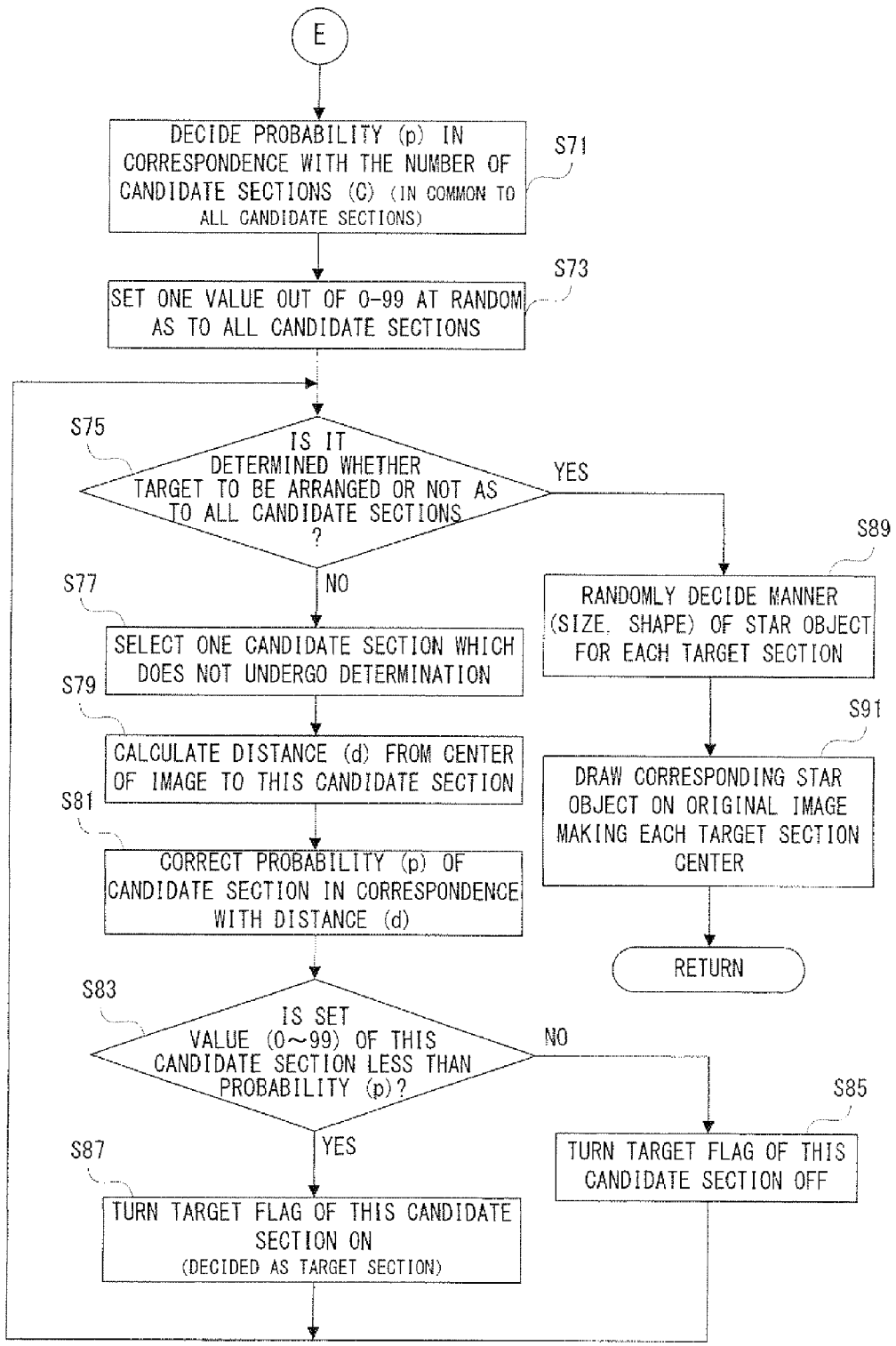
FIG. 21 is a flowchart showing another part of the operation by the CPU.

The image manipulation processing in the aforementioned step S31 is executed according to the subroutine shown in FIG. 19-FIG. 21. Referring to FIG. 19, the CPU 42 first reads an image to be processed, that is, an image imaged by the camera 16 or 18 into the original image area 78 (see FIG. 13) in a step S40. Next, in a step S41, various variables (difference value (A), accumulated difference value (B), the number of candidate sections (C), probability (p), etc.) stored in the variable area 76 of the main memory 48 are initialized. Next, in a step S43, it is determined whether or not a difference value is calculated as to all the pixels (180×120 pixels) making up of the original image 100 (see FIG. 10(A), FIG. 11(A), FIG. 12(A), for example) stored in the original image area 78. If "NO", the process proceeds to a step S45 to select one of the pixels which does not undergo the calculation in an order according to a raster scanning shown by the dotted lines in FIG. 6(B).

Next, in a step S47, by the filter Fit shown in FIG. 6, the difference value of the pixel is evaluated for each color component. The difference value ($\Delta R$, $\Delta G$ and $\Delta B$) for each color component is calculated by the aforementioned (Equation 2)-(Equation 4). Then, in a step S49, the sum of the difference values of the respective color components is evaluated and recorded as a difference value (A) of the pixel in the differential image area 80. The sum of the difference values is specifically calculated by the aforementioned (Equation 5). Thereafter, the process returns to the step S43 to repeat the similar processing.

When a calculation of the difference value as described above is ended as to the last pixel of the original image 100, for example, the pixel (179, 119), "YES" is determined in the step S43, and the process proceeds to a step S51. At this time, in the differential image area 80, a Y differential image (gray scale) corresponding to the original image 100 is stored. In the step S51, division of the original image 100 (and Y differential image corresponding thereto) into the sections 106 and initialization of the section data stored in the section area 82 are performed. Thus, the original image 100 of 180×120 pixels is divided into 9×6 sections 106, for example (see FIG. 10(B), FIG. 11(B), and FIG. 12(B)), and the variables and the flags included in the section data (see FIG. 14, FIG. 15, FIG. 16) are initialized.

Referring to FIG. 20, in a next step S53, it is determined whether or not a determination by a threshold value (determine whether a candidate or not) is performed as to all the sections 106. If "NO", the process proceeds to a step S55 to select any one of the sections 106 which does not undergo the determination in an order according to the raster scanning shown by the dotted lines shown in FIG. 7(A). Then, the processing in the steps S57-S63 is executed as to each pixel of the section 106.

More specifically, in the step S57, it is determined whether or not a determined by a threshold value is performed as to all the pixels of the section 106 (determination as to whether an outline or not). If "NO", the process proceeds to the step S59 to select any one of the pixels which doe not undergo the determination. Next, it is determined whether or not the difference value (A) of the pixel is equal to or more than the first threshold value (ThA), that is, whether or not the pixel is an outline in the step S61, and if NO (A<ThA), the process returns to the step S57. If "YES" in the step S61 (ThA≦A), the process proceeds to the step S63 to add the difference value (A) of the pixel to the accumulated difference value (B) of the section 106 included in the section data (B=B+A). Then, the process returns to the step S57 to repeat the similar processing.

When the aforementioned determination by the threshold value is completed as to the last pixel of the section 106, for example, the pixel (19, 19) in a case of the section (1, 1), "YES" is determined in the step S57, and the process shifts to a step S65. In the step S65, it is determined whether or not the accumulated difference value (B) of the section 106 is equal to or more than the second threshold value (ThB), that is, whether or not the section 106 is a candidate, if "NO" here (B<ThB), the candidate flag of the section 106 is turned off in step S67, and then, the process returns to the step S53. If "YES" in the step S65 (ThB≦B), the candidate flag of the section 106 is turned on in a step S69, and the number of candidate sections (C) is incremented (C=C+1). Then, the process returns to the step S53.

When the aforementioned determination by the threshold value is completed as to the last section 106, that is, the section (9, 6), for example, "YES" is determined in the step S53, and the process proceeds to a step S71. Referring to FIG. 21, in the step S71, a probability (p) corresponding to the number of candidate sections (C) is decided on the basis of the probability table (see FIG. 8(A)). The decided probability (p) is registered as a probability to be corrected in the section data (see FIG. 14, for example). The probability to be corrected is common to all the candidate sections 106C.

Next, in a step S73, any one value out of 0-99 is randomly set to all the candidate sections 106C. Then, in a step S75, it is determined whether or not a comparison between the set value and the probability is performed (determination as to whether or not the target) as to all the candidate sections 106C, and if "NO", the process proceeds to a step S77 to select any one of the candidate sections 106C which does not undergo the determination. In a next step S79, the distance (d) from the center of the image of the candidate section 106C, for example, the distance d (see FIG. 7(B)) from the center P of the original image 100 to the center Q of the candidate section 106C is calculated in the aforementioned (Equation 6), and the result is registered in the section data. Here, in place of calculating the distance as to each candidate section 106C, directly after the division into the sections 106 in the aforementioned step S51 (see FIG. 19), the distance (d) as to all the sections 106 is calculated, and the calculation result may be described in the section data.

Next, in a step S81, the probability (p) of the candidate section 106C is corrected in correspondence with the distance (d). More specifically, from the factor table in FIG. 8(B), a factor (0.25 or 1) corresponding to the distance (d) is obtained, and the factor is multiplied by the probability to be corrected, and then the multiplication result is registered in the section data as a corrected probability.

Next, in a step S83, it is determined whether or not the set value of the candidate section 106C is less than the corrected probability (p), and if "NO", the target flag of the candidate section 106C is turned off in a step S85 while if "YES", the target flag of the candidate section 106C is turned on in a step S87. Accordingly, the candidate section 106C is consequently decided as a target section 106S at the corrected probability (p), that is, p times per one hundred. Thereafter, the process returns to the step S75.

When a determination as to whether or not the last candidate section 106C is decided as a target section 106C is completed, "YES" is determined in the step S75, and the process shifts to a step S89. In the step S89, as to each target section 106S, the manner of the object to be drawn is randomly decided from the manners registered in the object table shown in FIG. 9, for example. In the section data, the object number corresponding to the manner thus decided is registered. At this point, the section data shown in FIG. 14, FIG. 15, and FIG. 16 is completed.

Then, in a step S91, the object (St1, St2 . . . ) corresponding to the number (1, 2 . . . ) is drawn in the original image 100 (see FIG. 10(A), FIG. 11(A), FIG. 12(A)) on the basis of the section data by making each target section 106S the center. Thus, an appropriate number of objects St1, St2 . . . are consequently arranged at appropriate positions along the outline 104 in the original image 100 (see FIG. 10(C), FIG. 11(C), FIG. 12(C)). Thereafter, the processing is restored to the main routine (sec FIG. 17, FIG. 18).

As understood from the above description, in the game apparatus 10 of this embodiment, the CPU 42 detects the outline 104 from the original image 100 stored in the original image area 78 by the filter Flt (S53-S69), selects the position to be drawn (target section 106S) from the positions (candidate sections 106C including the outline 104) in relation to the detected outline 104 (S71-S87), and draws the star object St1, St2 . . . at the selected position (target section 106S) (S91).

Thus, a target position is selected from the positions in relation to the outline, and a drawing is made at this position, and therefore, even if the user does not designate the position, the object can be drawn at the position of the outline of the image.

Figure 25:
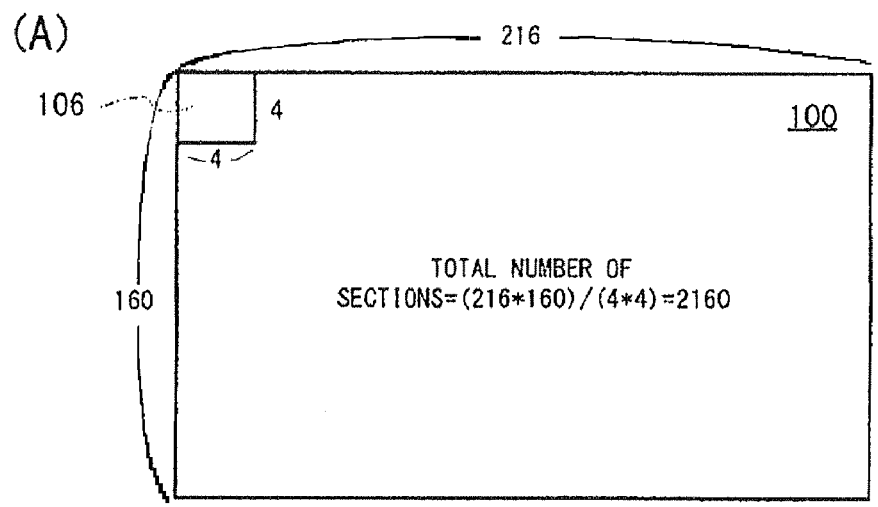
FIG. 25 is a illustrative view in association with a modified example.

It should be noted that the size of the original image 100, the size of the section 106, the probability table, the factor table, etc. are not restricted to those in this embodiment. In the modified example, as shown in FIG. 25(A), the original image 100 of 216 pixels×160 pixels is divided into sections 106 by 4×4 pixels (total number of sections 2160), and by utilizing the probability table shown in FIG. 25(B) and the factor table as shown in FIG. 25 (C), the target section 106S is decided.

In this case, from the original image with less parts of the outline as shown in FIG. 26(A), an image attached with stars as shown in FIG. 26(B), for example, can be obtained. Furthermore, from the original image with more parts of the outline as shown in FIG. 27(A), an image attached with stars as shown in FIG. 27(B), for example, can be obtained. That is, irrespective of the quantity of the outlines, the number of stars is approximately constant.

Figure 28:
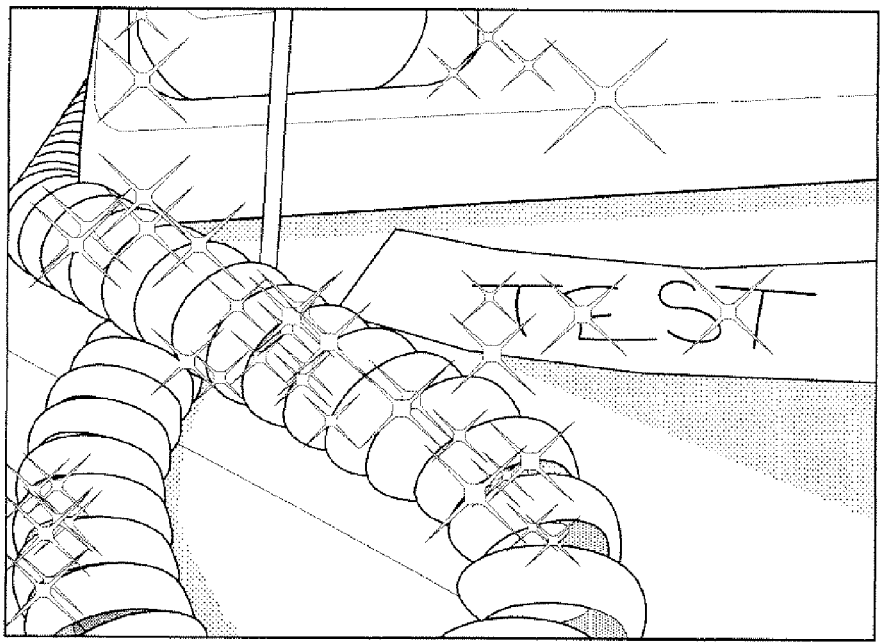
FIG. 28 is an illustrative view showing an image attached with stars when the probability table and the factor table are not utilized in the modified example in FIG. 25, and is compared with FIG. 27(B)

For purposes of comparison, an image attached with stars which is created without using the probability table and the factor table from the original image in FIG. 27(A) is shown in FIG. 28. In this case, a multiplicity of stars are arranged so as to be overlapped with one another to make it difficult to read the character of the "test". On the contrary thereto, in the image attached with stars shown in FIG. 27(B), stars are less overlapped with each other, and stars are less at especially the center, and therefore, the character is readable.

Figure 29:
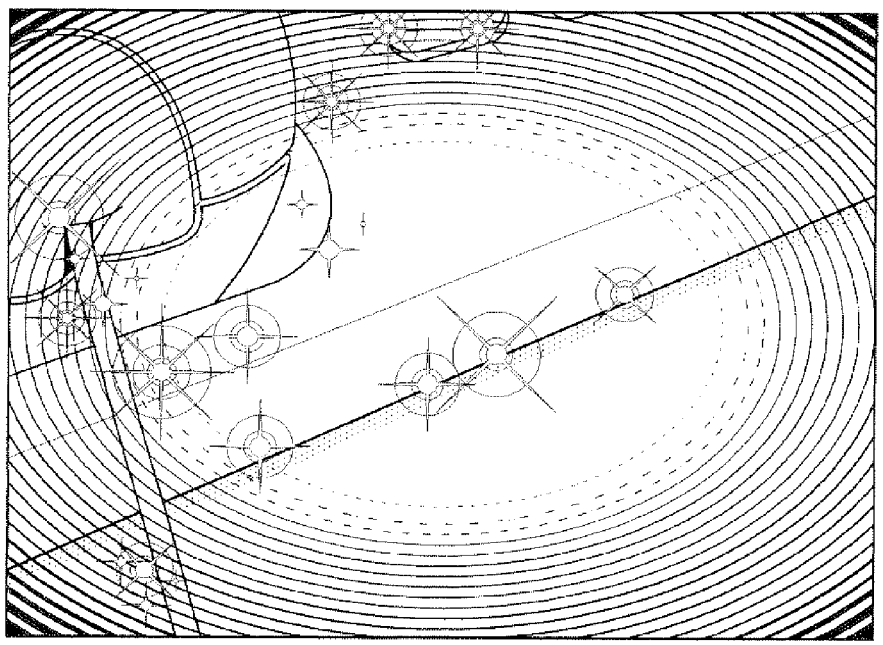
FIG. 29 is an illustrative view in association with another modified example, and shows an image attached with stars and gradation.

In another modified example, as shown in FIG. 29, objects in various manners may be drawn along the outline. In addition to such a drawing of the objects, effects such as gradation in correspondence with the distance from the center of the image may be added. The effect, such as a backlight filter may be given. "Adding" or "giving" effects here means that the pixel value is changed by a calculation (filter arithmetic operation, etc.). Here, drawing the object is implemented by changing the pixel value, and therefore, if changing the pixel value is defined as "drawing", and a representation of "effect drawing" may be possible.

It should be noted that the filter used for detecting the outline may be an already-existing one, such as a Sobelfilter, a Prewittfilter, a Laplacianfilter, a Robertsfilter, for example, over the filter Flt shown in FIG. 6. In any filter, the factor is multiplied by a noticeable pixel and the adjacent pixels, and by summing up the resultants, the difference value (or rate of change) between the noticeable pixel and the adjacent pixels is calculated, but depending on the filter, the number of adjacent pixels and the arrangement thereof, and the difference in factors assigned to each pixel makes it possible to emphasize the edge, reduce the effect of the noise, heighten the sensitivity of a smooth edge, and reduce the difference in sensitivity depending on the direction of the edge. On the contrary thereto, in the filter Flt in FIG. 6 as described above, detection of the outline in an oblique direction is possible, but detections of the outline along the X-axis and the Y-axis are difficult. However, in this embodiment, the outline itself need not be drawn, and the image need not be cut out along the outline, but it is only necessary to draw an appropriate number of objects along the outline. Thus, there is no need of heighten the detection accuracy more than necessary, and thus, the filter Flt shown in FIG. 6 which can obtain the required detection accuracy with less arithmetic operations is more preferable.

Furthermore, in this embodiment, the image imaged by each of the cameras 16 and 18 is worked as an original image 100, but the original image 100 may be an image handwritten by the touch panel 28 or various images (camera image, handwritten image, scanner image, CG image, etc.) captured from the memory card 38a through the memory card I/F 44.

Additionally, in this embodiment, the probability (p) is decided, and then, the distance (d) from the center is evaluated for each section 106, and by multiplying the probability (p) by the factor in correspondence with the distance (d), a probability correction is performed. However, if a table (not illustrated) in which two conditions, such as the number of candidate sections (C) and the distance (d) are mixed is prepared in advance, in the step S71 for deciding the probability (p), it is possible to simultaneously perform the probability correction.

In addition, in this embodiment, assuming that the subject 102 is positioned at the center of the original image 100, the distance (d) from the center P of the original image 100 to the center Q of each section 106 is evaluated, but a distance from an adequate reference point of the original image 100 to an adequate reference point of each section 106 may be evaluated. Moreover, the user is allowed to select the position of the reference point of the original image 100. In a case that the subject 102 exists at the upper right of the original image 100, in response to the user touching (designating) the position at the upper right edge of the original image 100, the distance from the position of the upper right edge may be evaluated.

Furthermore, in this embodiment, the probability (p) is corrected to be low as the section 106 is nearer to the center P of the original image 100 (adequate reference point), but in another embodiment, the probability (p) may be corrected to be low as the section 106 is far away from the reference point (the probability (p) is high as the section 106 is near the reference point). This makes easy for the target sections 106S to be collected to the reference point, and therefore, for example, a lot of objects are drawn along the outline 104 of the subject to thereby emphasize the subject.

Figure 30:
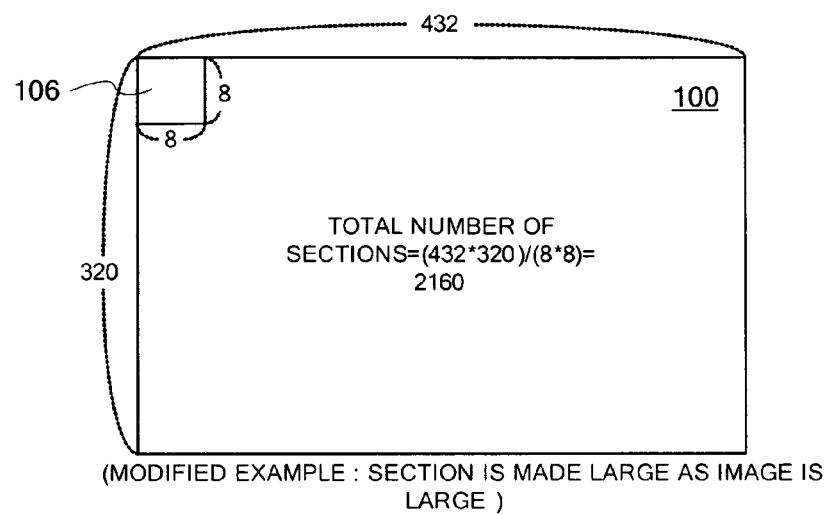
FIG. 30 is an illustrative view in association with the other modified example, and corresponds to FIG. 25(A)
Figure 31:
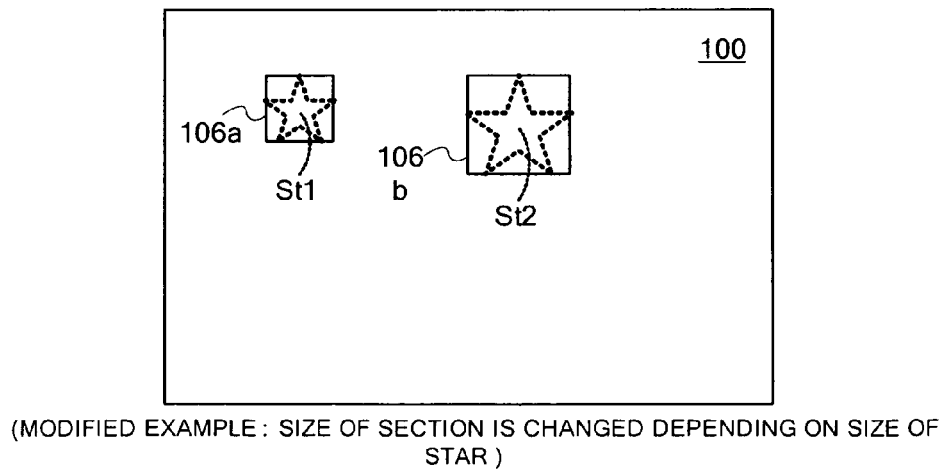
FIG. 31 is an illustrative view in association with a still another modified example, and shows a section variable in size.

Additionally, as the original image 100 is large, the section 106 is made large. One example is shown in FIG. 30. The original image 100 has a size of 432×320. That is, in comparison with the original image 100 shown in FIG. 25(A), the size of original image is doubled longitudinally and transversely, so that the size of the section 106 is doubled longitudinally and transversely, that is, 8×8. In this case, with respect to either original image 100, the total number of sections is 2160. Thus, similar objects can be arranged even as to the large original image 100 or the small original image 100 when seen entirely. This is generally similar to the correction processing of changing the probability (p) in correspondence with the number of candidate sections (C).

Alternatively, the section 106 can be changed depending on the size of the object. In a case that large stars are drawn, when two or more stars are drawn closely, they looks as if they overlap with each other and are low-attractive, and therefore, the section 106 is made large. In a case that small stars are drawn, even if they are close to each other to a certain extent, they do not look as if they overlap with each other, and therefore, the section 106 can be made small. In this case, before the division into the sections 106 in the step S51, the size of the section has to be decided. For example, when a crystal filter is selected in the step S23, if the size of the star (average size, minimum size or maximum size, for example) is designated, the size of the section in correspondence with the size of the designated star can be decided at the division into the sections in the step S51.

Furthermore, in this embodiment, if the objects are intended to be arranged at an average of 10% of all the candidate sections 106C, the probability of each candidate section 106C may be set to 10%. In this case, the arrangement of the object is made at random. In another embodiment, the target sections 106S may be arranged in order such that after nine non-target sections are arranged, one target section 106S is arranged. The interval between the objects need not to be uniform, and may be one per ten on average. Accordingly, the target sections 106S may be arranged unequally such that after nine non-target sections are arranged, one target section 106S is arranged, after four non-target sections are arranged, one target section 106S is arranged, and then, after fourteen non-target sections are arranged, one target section 106S is arranged.

Additionally, in this embodiment, the manner of the object to be arranged in each target section 106S is decided at random, but it may be decided on the basis of the accumulated difference value (B) of each of the target sections 106S. This makes it possible to arrange an object in a manner depending on the strength of the edge. For example, if the larger the accumulated difference value (B) is, the larger the object is made, the strength of the edge can be intuitively shown by the size of the object.

Furthermore, if there are candidate sections 106C being adjacent to each other, the number of them is counted. The more the number is, the larger the object is displayed whereas the lower the probability at which they become the target section 106S is made. That is, candidate sections 106C being adjacent to each other are collected as a group, and the object may be largely drawn at the collected candidate sections 106C.

Moreover, in this embodiment, the original image 100 is divided into a plurality of sections 106, and the candidate sections 106C are selected out of them. Then, each candidate section 106C is decided to be the target section 106S at the probability in correspondence with the number of candidate sections (C). However, these processing may be performed by pixels (that is, sections may be dealt as pixels). That is, out of all the pixels being made up of the original image 100, the candidate pixels being made up of the outline are selected, and each candidate pixel can be decided to be a target pixel at the probability in correspondence with the number of candidate pixels. Here, processing by pixels needs an enormous amount of processing amount, and easily generates noise. On the other hand, processing by sections has an advantage of reducing the processing amount, generating less noise, and ensuring spaces between objects by suitably selecting the size of the section. Thus, the processing by sections each being made up of a plurality of pixels is suitable for this embodiment.

Here, in a case that the object arranging processing is performed by pixels, the objects are apt to be successively (densely) drawn, and therefore, processing of adjusting the space between the objects can be interposed so as not to make the continuous pixels as a pixel to be drawn. Furthermore, in a case that the object arranging processing is performed by sections as well, the processing of adjusting the space between the objects can be applied when drawing is intended to be made with a longer space. As an example of the space adjusting method, a minimum distance when objects are not overlapped with each other (space equal to or more than the predetermined value is ensured) is calculated, and each object is arranged such that the distance from the center is equal to or more than the minimum distance. Additionally, as another method, the minimum distance is similarly calculated, and the position (objective pixel) of the object is decided once. If another two or more target pixels are present within the minimum distance from one objective pixel, any one of them is left and the other may be erased (is moved outside the minimum distance).

In the above-described embodiment, the explanations are made on the game apparatus 10, but the present invention can be applied to an image processing apparatus (PC, FDA, cellular phone, etc. other than the game apparatus) having a computer (CPU). The present invention can be applied to an image processing system in which each processing is distributedly executed by a plurality of computers, etc. In the image processing system, all the processing may be executed by one information processing apparatus (computer).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing an image processing program, wherein
said image processing program causes a computer of an image processing apparatus to execute functionality comprising:
an outline detector for detecting an outline from an image;
a position-to-be-drawn selector which selects a position to be drawn from positions in relation to the outline detected by said outline detector; and
a drawer which performs a predetermined drawing at the position selected by said position-to-be-drawn selector.

2. The non-transitory storage medium storing an image processing program according to claim 1, wherein
said position-to-be-drawn selector selects the position to be drawn from said positions in relation to the outline according to a predetermined ratio.

3. The non-transitory storage medium storing an image processing program according to claim 2, wherein
said position-to-be-drawn selector:
counts said positions in relation to the outline,
sets the ratio in correspondence with the number of positions in relation to the outline, and
selects the position to be drawn from said positions in relation to the outline according to said ratio.

4. The non transitory storage medium storing an image processing program according to claim 3, wherein
said position-to-be-drawn selector sets a small ratio as said number of positions in relation to the outline is many.

5. The non-transitory storage medium storing an image processing program according to claim 1, wherein
said position-to-be-drawn selector:
calculates a distance from a predetermined position of said image to each of said positions in relation to the outline,
sets a ratio at which the position to be drawn is selected in correspondence with said distance, and
selects the position to be drawn according to the ratio from said positions in relation to the outline.

6. The non-transitory storage medium storing an image processing program according to claim 5, wherein
said position-to-be-drawn selector:
calculates a distance from a center of said image to each of said positions in relation to the outline, and
sets a ratio above a predetermined value as said distance is large.

7. The no storage medium storing an image processing program according to claim 1, wherein
said position-to-be-drawn selector randomly selects the position to be drawn from said positions in relation to the outline.

8. The non-transitory storage medium storing an image processing program according to claim 1, wherein
said outline detector:
calculates, as to each pixel making up of said image, for each color component, a difference value between a first summed value obtained by summing color component values of said pixel, or said pixel and one or more adjacent pixels, and a second summed value obtained by summing color component values of the adjacent pixels not including said pixel which is the same number of pixels as that used for calculating the first summed value, and calculates a summed difference value by adding these difference values calculated, for each color component as to said pixel,
determines whether or not said summed difference value in each pixel of said image is equal to or more than a first threshold value, and
detects the pixel which is determined to be equal to or more than the first threshold value as a pixel making up of the outline.

9. The non-transitory storage medium storing an image processing program according to claim 1, wherein
said image is divided into a plurality of sections each being made up of two or more pixels, and
said outline detector:
calculates, as to each pixel making up of said image, for each color component, a difference value between a first summed value obtained by summing color component values of said pixel, or said pixel and one or more adjacent pixels, and a second summed value obtained by summing color component values of the adjacent pixels not including said pixel which is the same number of pixels as that used for calculating the first summed value, and calculates a summed difference value by adding these difference values calculated, for each color component as to said pixel,
determines whether or not said summed difference value of the pixel making up of each section is equal to or more than a first threshold value,
accumulates the summed difference values of the respective pixels which are determined to be equal to or more than the first threshold value for each section to evaluate an accumulated difference value, determines whether or not the accumulated difference value of each section is equal to or more than a second threshold value, and detects the section which is determined to be equal to or more than said second threshold value as a section in relation to the outline, wherein said position-to-be-drawn selector selects a section to be drawn from the sections in relation to said outline.

10. The non-transitory storage medium storing an image processing program according to claim 2, wherein said position-to-be-drawn selector:

counts said positions in relation to the outline, sets a probability in correspondence with the number of positions in relation to the outline, and decides whether or not each of said positions in relation to the outline is an object to be drawn on the basis of said probability.

11. The non-transitory storage medium storing an image processing program according to claim 10, wherein said position-to-be-drawn selector calculates a distance from a predetermined position of said image to each of said positions in relation to the outline, corrects said probability in correspondence with said distance, and performs said decision on the basis of said corrected probability.

12. The non transit storage medium storing an image processing program according to claim 1, wherein said image processing apparatus further comprises an imager, and said image processing program causes said computer to further perform functionality comprising an image reader which reads an image imaged by said imager, wherein said outline detector detects the outline from the image imaged by said image reader.

13. An image processing method implemented using an information process apparatus having one or more processors, comprising:

detecting, via the one or more processors, an outline from an image;

selecting a position to be drawn from positions in relation to the detected outline; and performing a predetermined drawing at the selected position.

14. An image processing system, comprising:

a display device configured to display image data; and an information processing device associated with the display device and one or more processors, the information processing device configured to perform functionality comprising:

an outline detector for detecting, via the one or more processors, an outline from an image, a position-to-be-drawn selector which selects a position to be drawn from positions in relation to the outline detected by said outline detector, and a drawer which performs a predetermined drawing at the position selected by said position-to-be-drawn selector.

15. An image processing apparatus, comprising:

a processing system, comprising one or more processors, configured to:

detect an outline from an image, select a position to be drawn from positions in relation to the detected outline, and perform a predetermined drawing at the selected position.

16. The non-transitory storage medium storing an image processing program according to claim 1, wherein the position is to be drawn from one or more candidate positions detected in the outline detected by said outline detector based on a candidate position having a highest probability value compared to the other candidate positions.

\* \* \* \* \*